United States Patent
Marritt

(12) 
(10) Patent No.: US 7,195,666 B2
(45) Date of Patent: Mar. 27, 2007

(54) POLYURONIC ACID DERIVATIVE AND AQUEOUS INK COMPOSITION POLYURONIC ACID DERIVATIVE

(75) Inventor: William Marritt, Nagano-Ken (JP)

(73) Assignee: Seiko Epson Corporation, Tokyo (JP)

(*) Notice: Subject to any disclaimer, the term of this patent is extended or adjusted under 35 U.S.C. 154(b) by 266 days.

(21) Appl. No.: 10/523,455

(22) PCT Filed: Jul. 30, 2003

(86) PCT No.: PCT/JP03/09681

§ 371 (c)(1),
(2), (4) Date: Jan. 28, 2005

(87) PCT Pub. No.: WO2004/011502

PCT Pub. Date: Feb. 5, 2004

(65) Prior Publication Data

US 2006/0155060 A1    Jul. 13, 2006

(30) Foreign Application Priority Data

Jul. 30, 2002  (JP) ............ 2002-221995
Mar. 3, 2003   (JP) ............ 2003-055956
Apr. 7, 2003   (JP) ............ 2003-103462
Apr. 7, 2003   (JP) ............ 2003-103463

(51) Int. Cl.
C09D 11/14  (2006.01)
C08B 31/00  (2006.01)
C08L 79/00  (2006.01)

(52) U.S. Cl. .................. 106/31.68; 106/31.75; 525/54.24; 524/599

(58) Field of Classification Search ........... 106/31.68, 106/31.75; 525/54.24; 524/599
See application file for complete search history.

(56) References Cited

U.S. PATENT DOCUMENTS

| 5,871,572 | A | * | 2/1999 | Marritt | 106/31.36 |
| 6,051,057 | A | | 4/2000 | Yatake et al. | |
| 6,132,502 | A | | 10/2000 | Yatake | |
| 6,139,880 | A | * | 10/2000 | Dolak et al. | 424/650 |
| 6,231,655 | B1 | * | 5/2001 | Marritt | 106/31.58 |
| 6,242,529 | B1 | | 6/2001 | Marritt et al. | |
| 6,586,589 | B1 | * | 7/2003 | Marritt | 536/124 |
| 6,770,756 | B1 | * | 8/2004 | Marritt | 536/127 |
| 6,776,830 | B2 | * | 8/2004 | Marritt | 106/31.68 |
| 7,107,905 | B2 | * | 9/2006 | Mori | 101/453 |
| 2002/0016453 | A1 | * | 2/2002 | Marritt | 536/123 |
| 2002/0185038 | A1 | * | 12/2002 | Marritt | 106/31.68 |

FOREIGN PATENT DOCUMENTS

| EP | 0 894 835 | 2/1999 |
| JP | 2000-169769 | 6/2000 |
| WO | 01/94476 | 12/2001 |

OTHER PUBLICATIONS

Computer-Generated English Translation of Specification and Claims and Patent Abstracts of Japan of JP 2000-169769 dated Jun. 20, 2000.

* cited by examiner

Primary Examiner—Helene Klemanski
(74) Attorney, Agent, or Firm—Ladas and Parry LLP

(57) ABSTRACT

A self-dispersed pigment ink composition is provided which gives reliable printing performance and yields printed images that have excellent print quality and a dispersant which can realize the ink composition. New polyuronic acid derivatives, as a dispersant, according to the present invention characterized in that polyuronic acids are attached by reductively amination, through reducing termini of the polyuronic acids, to glyceryl poly(oxypropylene) triamine.

16 Claims, No Drawings

POLYURONIC ACID DERIVATIVE AND AQUEOUS INK COMPOSITION POLYURONIC ACID DERIVATIVE

TECHNICAL FIELD

This invention relates to a new polyuronic acid derivative and an ink composition comprising the polyuronic acid derivative as a dispersant or an additional polymer, especially for use in an ink jet printing method.

BACKGROUND ART

Ink jet printing is a non-impact printing process in which the printer produces droplets of ink in response to digital signals, such as those generated by a computer. The droplets of ink are deposited on a substrate such as paper or transparent films. Ink jet printers have found broad commercial acceptance due to their print quality, low cost, relatively quiet operation, and graphics capability.

The inks used in ink jet printers can be classified as either dye-based inks or pigment-based inks. Dye-based inks are satisfactory for most applications, but generally have poor light fastness and water resistance. As a printed document is expected to have a certain degree of permanency, the lack of light fastness and water resistance of the printed image derived from dye-based inks is a problem. Pigment-based inks can be prepared which have excellent light fastness and water resistance. Thus, for purposes of obtaining a printed document with a reasonable degree of permanency, pigment-based inks are preferred over dye-based inks.

A great concern with ink jet printing is the level of print quality, as defined by edge acuity or sharpness of an image and minimal feathering, which can be obtained on "plain paper." In recent years there has been an increasing demand for ink jet printers that provide excellent print quality on plain paper. The present invention is mainly concerned with print quality as defined by edge acuity or sharpness of the printed images on plain paper. In terms of print quality on plain paper, suitably designed pigment-based inks are especially desired.

When a liquid ink droplet contacts the paper surface as a result of ink jet printing, the liquid spreads out from the impact origin and penetrates the paper. Cellulose fibers, present in most plain papers, tend to act as wicks that draw the liquid along the length of the individual fibers by capillary action. In dye-based inks, in which the colorant is homogeneously dissolved in the liquid, the colorant will spread out, penetrate, and be drawn along the length of cellulose fibers to the exact same degree as the liquid. The typical result for a dye-based ink is a colored dot that has poorly defined feathered edges.

In pigment-based inks, in which the colorant is homogeneously dispersed in the liquid, unless the dispersion stability of the colorant is disrupted upon contact with the paper, the colorant will spread out, penetrate, and be drawn along the length of cellulose fibers to the nearly the same degree as the liquid. The typical result for a conventional pigment-based ink is a colored dot that has poorly defined feathered edges.

In contrast, a suitably designed pigment-based ink, in which the dispersion stability of the colorant is disrupted upon contact with the paper, the colorant will not spread out, penetrate, and be drawn along the length of cellulose fibers in the same way as the liquid. For this type of ink, the colorant effectively separates from the liquid carrier. The result is a colored dot that has a sharp edge boundary with negligible feathering.

Water-based pigment dispersants are well known in the art, and have been used commercially for applying films, such as paints, to various substrates. A dispersant using a polyuronic acid is also suggested. For example, in U.S. Pat. No. 6,242,529, a polyuronic acid derivative in which a hydrophobic polymer is covalently attached to the reducing terminus of the polyuronic acid is disclosed as a dispersant. These hydrophobic polymers include photopolymers or copolymers prepared from at least one monomer selected from the group consisting of styrene or substituted styrenes, vinyl pyridine or substituted pyridines, methacrylic acid esters, acrylic acid esters, acrylonitrile, methacrylonitrile, butadiene, and isoprene. The hydrophobic polymers also include poly(dimethylsiloxane), hydrophobic polyamides, and hydrophobic polyamines.

On the other hand, one general approach for obtaining reliable aqueous pigment-based inks is to use self-dispersed pigments in the ink formulations. As the descriptive phrase, "self-dispersed," is commonly used, these pigments do not require dispersing agents, such as polymeric dispersants or surfactants to produce stable dispersions of the pigment in the aqueous vehicle. The means by which the pigments are self-dispersed is the deliberate introduction onto the surface of the pigment particles of a sufficient number of charged functionalities. This approach has been widely applied to black pigments derived from carbon black.

With regard to print quality on plain paper, aqueous pigment-based inks that use self-dispersed pigments in the ink formulations are advantageous. Specifically, the print-quality advantage arises from the fact that inks can be formulated with relatively high pigment contents when self-dispersed pigments are used. High pigment contents generally translate into high optical densities when the inks are printed on plain paper. As noted above, high optical densities typically result in images that are preferred by consumers in comparison with images with lower optical densities that are perceived as "dull."

When printing by using aqueous pigment-based inks comprising self-dispersed pigments, however, they yield images with exceptionally poor lustrousness and exceptionally poor adhesion on coated specialty media. These failings are generally attributed to the non-inclusion of polymeric dispersing agents in the ink. Polymeric dispersing agents, which typically are resinous and partially bonded to the pigment surfaces, act as both a glaze for smoothing out the rough surface of the pigment and as a binder for mediating adhesion between pigment particles and adhesion between pigment particles and the surface of the specialty media.

A simple and obvious approach to overcoming the adhesion deficiency of inks that use self-dispersed pigments is to add a resinous polymeric binder to the ink composition. The inclusion of the resinous binder, which can function as a glaze, also improves the lustrousness of the printed images on coated specialty media in comparison to those images derived from unadulterated self-dispersed pigment formulations. As far as the present inventors know, the self-dispersed pigment/binder combinations may fall considerably short of the adhesion and lustrousness that is achieved routinely using non-self-dispersed pigment dispersions, in which a dispersing agent is required to produce a stable dispersion.

There is a demand for pigment dispersed aqueous ink compositions that give reliable printing performance and yield is printed images having excellent print quality.

Further, there remains a demand for self-dispersed pigment aqueous ink compositions that give reliable printing performance and yield excellent print quality, specifically on plain paper.

Furthermore, there is a demand for self-dispersed pigment aqueous ink compositions that yield excellent print quality on coated specialty media that exhibit lustrousness. In particular, there remains a demand for self-dispersed pigment aqueous ink compositions that yield print quality on coated specialty media such that good lustrousness and good adhesion are obtained.

SUMMARY OF THE INVENTION

The present inventors have now found that a certain kind of new polyuronic acid derivatives are excellent as a dispersant and an additional polymer. The present invention has been made based on such findings.

Accordingly, it is an object of the present invention to provide a pigment dispersed aqueous ink composition which gives reliable printing performance and yields printed images that have excellent print quality, especially on plain paper, and a dispersant which can realize the ink composition.

Furthermore, it is an object of the present invention to provide a self-dispersed pigment aqueous ink composition which gives reliable printing performance and yields printed images that have excellent print quality, especially excellent lustrousness and fixation for printing on both plain paper and coated specialty media.

According to the present invention, there is provided a new polyuronic acid derivative comprising glyceryl poly(oxypropylene) triamine and polyuronic acids which are attached by reductively amination, through reducing termini of the polyuronic acids, to the glyceryl poly(oxypropylene) triamine.

According to the first preferred aspect of the present invention, there is provided the polyuronic acid derivative wherein one polyuronic acid is attached by reductively amination, through a reducing terminus of the polyuronic acid, to the glyceryl poly(oxypropylene) triamine which is represented by the general formula:

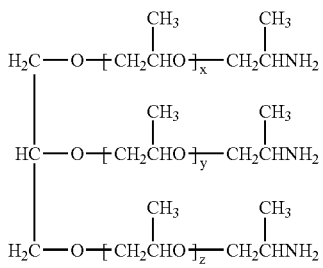

wherein the average value of the sum, x+y+z, is greater than or equal to 10 and less than or equal to 150, more preferably greater than or equal to 10 and less than or equal to 100.

According to the second preferred aspect of the present invention, there is provided the polyuronic acid derivative wherein two to six polyuronic acids are attached by reductively amination, through reducing termini of the polyuronic acid, to the glyceryl poly(oxypropylene) triamine which is represented by the general formula:

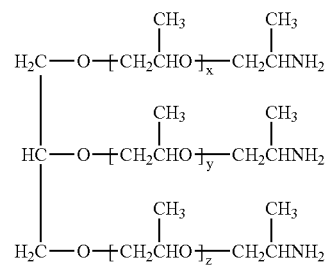

wherein the average value of the sum, x+y+z, is greater than or equal to 30 and less than or equal to 250, more preferably greater than or equal to 10 and less than or equal to 120.

Further, according to the present invention, there is provided an aqueous ink composition comprising water as the principal solvent, a self-dispersed pigment, and the polyuronic acid derivative descried above.

DESCRIPTION OF THE PREFERRED EMBODIMENTS

Polyuronic Acid Derivatives

New polyuronic acid derivatives according to the present invention are composed of two parts: a hydrophilic polyuronic acid segment and a hydrophobic polymer segment derived from a glyceryl poly(oxypropylene) triamine.

The polyuronic acid derivative according to the present invention functions as a dispersant for dispersing pigments in ink compositions. The resulting pigment dispersed aqueous ink composition gives reliable printing performance and yields printed images that have excellent print quality, especially on plain paper. Although the reason for this has not been fully elucidated yet, it is believed that the polyuronic acid derivative of the present invention, which contains a hydrophobic segment and a hydrophilic segment, functions better than conventional two-part type dispersants. It yields stable dispersed pigments from which printed images, which are free of feathering, are realized. The hydrophobic segment of the derivative adheres to the surface of the pigment such that the pigment is dispersed effectively in the ink composition. Furthermore, the polyuronic acid segment of the derivative has a structure containing up-down alternating pockets lined with carboxy groups and hydroxyl groups that are just the right size for binding multivalent cations, especially dipositive calcium ions. When the polyuronic acid segment of the polyuronic acid derivative binds to multivalent cations, which are present on the surfaces of typical plain papers, the stability of the pigment dispersion is disrupted. This inhibits the pigment colorant from spreading out on the paper such that printed images, which are free of feathering, are realized.

<Polyuronic Acid Segment>

The polyuronic acid is selected from the group of polyuronic acids consisting of either 1,4-linked poly-(α-D-galacturonic acid) or 1,4-linked poly-(α-L-guluronic acid). These polyuronic acids are available from natural materials and may also contain small amounts of other uronic acid saccharides and/or non-uronic acid saccharides. In 1,4-linked poly-(α-D-galacturonic acid) the impurity component is generally the non-uronic acid saccharide, rhamnose. In 1,4-linked poly-(α-L-guluronic acid) the impurity component is generally the uronic acid saccharide, mannuronic acid. The D-galacturonic acid content of the 1,4-linked poly-(α-D-galacturonic acid) used in this invention is greater than 85% wt. %. More preferably the D-galacturonic acid content is greater than 90 wt. %. Even more preferably the D-galacturonic acid content is greater than 95 wt. %. The L-guluronic acid content of the 1,4-linked poly-(α-L-guluronic acid) used in this invention is greater than 80% wt. % More preferably the L-guluronic acid content is greater than 85 wt. %. Even more preferably the L-guluronic acid content is greater than 90 wt. %.

1,4-linked poly-(α-D-galacturonic acid) is obtained by de-esterification and hydrolysis of pectin, a naturally occurring hydrocolloid which is obtained from fruits such as lemons, limes, grapefruits, oranges, mangoes, apples, sunflowers, and sugar beets. The highly water-soluble 1,4-linked poly-(α-D-galacturonic acid) product can be isolated from the hydrolysis reaction solution by (1) evaporation of the solvent, (2) precipitation induced by the addition of a poor solvent for the product, or a combination of (1) and (2). 1,4-linked poly-(α-L-guluronic acid) is obtained by partial acid hydrolysis of alginic acid, a naturally occurring polysaccharide obtained from seaweeds such as giant kelp (*Macrocystis pyrifera*), horsetail kelp (*Laminaria digitata*), and sugar kelp (*Laminaria saccharina*), followed by selective precipitation. Selective precipitation may be carried out by the controlled addition of acetic acid to an aqueous solution of the 1,4-linked poly-(α-L-guluronic acid) product.

The number average molecular weight of the polyuronic acid used in the present invention is greater than or equal to about 700 and less than or equal to 15,000, more preferably greater than or equal to about 700 and less than or equal to about 10,000.

<Hydrophobic Polymer Segment>

The hydrophobic polymer segment is that derived from a glyceryl poly(oxypropylene) triamine represented by the general formula:

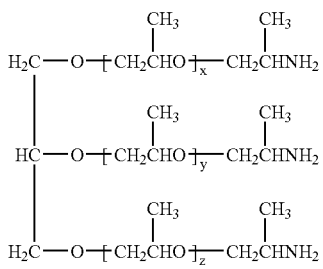

wherein, in the polyuronic acid derivative according to the first embodiment of the present invention, the average value of the sum, $x+y+z$, is greater than or equal to 10 and less than or equal to 150, more preferably greater than or equal to 10 and less than or equal to 100.

Further, in the polyuronic acid derivative according to the second embodiment of the present invention, the average value of the sum, $x+y+z$, is greater than or equal to 30 and less than or equal to 250, more preferably greater than or equal to 30 and less than or equal to 120.

Glyceryl poly(oxypropylene) triamines are commercially available from Huntsman Corporation (Performance Chemicals Division; Houston, Tex., USA). These compounds are used as highly reactive soft blocks in polyurea RIM and spray applications. They also have uses as thermoplastic modifiers and as adhesion promoters in epoxy systems. They also have uses as modifiers and as curatives in polyurethane elastomers and foams. At the present time, Huntsman Corporation has glyceryl poly(oxypropylene) triamines available in two different average molecular weight distributions, Jeffamine XJT-509 and Jeffamine T-5000. The former has an average molecular weight of approximately 3000 with an average sum, $x+y+z$, equal to about 50. The latter has an average molecular weight of approximately 5000 with an average sum, $x+y+z$, equal to about 80. Both Jeffamine XJT-509 and Jeffamine T-5000 are insoluble in water as is expected for hydrophobic polymers. On the other hand, they are quite soluble in alcoholic solvents.

In the polyuronic acid derivative according to the first embodiment of the present invention, as the sum, $x+y+z$, approaches the lower limit of 10, these glyceryl poly(oxypropylene) triamines are expected to become only slightly soluble in water.

Further, in the polyuronic acid derivative according to the second embodiment of the present invention, even as the sum, $x+y+z$, approaches the lower limit of 30, these glyceryl poly(oxypropylene) triamines are not expected to be soluble in water.

Polyuronic Acid Derivative According to the First Embodiment of the Present Invention Polyuronic acid derivative according to the present invention is that polyuronic acids are attached by reductively amination, through reducing termini of the polyuronic acids, to glyceryl poly(oxypropylene) triamine.

There are several important considerations with regard to the covalent attachment by reductive amination that are described below.

As to the first consideration, in order to attach only one polyuronic acid molecule per glyceryl poly(oxypropylene) triamine molecule, it is necessary to use at least a three-fold molar excess of the triamine with respect to the polyuronic acid. The triamine has three reactive amines, two associated with the poly(oxypropylene) branches attached to the terminal hydroxyl oxygen atoms of the glyceryl unit and one associated with the poly(oxypropylene) branch attached to the central hydroxyl oxygen atom of the same glyceryl unit. Preferably, a solution of the polyuronic acid starting material is added to a solution containing at least a fivefold molar excess of the glyceryl poly(oxypropylene) triamine starting material. Arising by-product is practically unavoidable because the by-product is produced when a small amount of polyuronic-acid doubly attaches to a single glyceryl poly(oxypropylene) triamine. Therefore, the mixture containing this by-product is included within the scope of the present invention.

As to the second consideration, in attaching one polyuronic acid molecule per glyceryl poly(oxypropylene) triamine molecule, it is that the product obtained is a complex mixture, even if the small unavoidable by-product described in the above section is ignored. First, the polyuronic acid starting material is a complex mixture of polyuronic acid molecules having a relatively broad range of degrees of polymerization. Theoretically one could use expensive and time-consuming separation methods on the polyuronic acid starting material in order to obtain pure fractions containing polyuronic acid molecules of the exact same degree of polymerization. However, such fractionation is neither economically practical nor necessary from the standpoint of the performance of the dispersant product. Second, the glyceryl poly(oxypropylene) triamine starting material also is a complex mixture of glyceryl poly(oxypropylene) triamine molecules with a relatively broad range for the total count of propylene oxide units. Furthermore, the distribution of propylene oxide units among the three glyceryl hydroxyls varies considerably. Third, the combination of a broad distribution of polyuronic acid molecules with a broad distribution of glyceryl poly(oxypropylene) triamine molecules results in an even broader distribution of product molecules being formed. Fourth, even if both the starting materials were structurally pure fractions, the combination of one polyuronic acid and one glyceryl poly(oxypropylene) triamine, under practical reaction conditions, will result in a mixture of three isomers: about one-third statistically will consist of one polyuronic acid bound to one of the two poly(oxypropylene) branches attached to the terminal hydroxyl oxygen atoms of the glyceryl unit, about one-third statistically will consist of one polyuronic acid bound to the other of the two poly(oxypropylene) branches attached to the terminal hydroxyl oxygen atoms of the glyceryl unit, and about one-third statistically will consist of one polyuronic acid bound to the poly(oxypropylene) branch attached to the central hydroxyl oxygen atom of the glyceryl unit. Considering this positional isomerism, the tri-positional combination of a broad distribution of polyuronic acid molecules with a broad distribution of glyceryl poly(oxypropylene) triamine molecules results in an even broader distribution of product molecules than envisioned in the absence of the positional isomerism. In any case, it is neither economically practical nor typical necessary from the standpoint of the performance of the dispersant product to try and separate the dispersant product into structurally pure fractions.

As to the third consideration, in attaching one polyuronic acid molecule per glyceryl poly(oxypropylene) triamine molecule, although it is not absolutely necessary, it is extremely desirable to effect the reaction of the two reactants in a homogeneous solution. Homogeneous conditions for the initial combination of the two reactants are desirable for achieving the conditions in which the glyceryl poly(oxypropylene) triamine is in a molar excess with respect to the polyuronic acid. Heterogeneous mixtures have mass-transfer limitations that make achievement of the molar excess condition difficult on the molecular scale. In other words, even if a huge excess of the glyceryl poly(oxypropylene) triamine is present, rate of transfer of one reactant to a different phase which contains the other reactant is limited by the surface area of the interfacial region between the reactants. In the worst-case scenario, (1) glyceryl poly(oxypropylene) triamine is transferred to the phase containing the polyuronic acid component in preference to the reverse transfer and (2) the combination of the reactants is fast with respect to the phase-to-phase transfer. In this scenario, with phase-to-phase transfer being rate limiting, after transfer of one molecule of the poly(oxypropylene) triamine to the polyuronic acid containing phase, three molecules of polyuronic acid have a high probability of combining with one molecule of the poly(oxypropylene) triamine. This is counter to the intent with which one uses an excess of the glyceryl poly(oxypropylene) triamine reactant.

Thus, as to this third consideration, it is extremely desirable to carry out the reductive amination reaction in a homogeneous solution. Because the polyuronic acid component is very hydrophilic and the glyceryl poly(oxypropylene) triamine component is by design hydrophobic, finding a compatible solvent medium is potentially problematic. Nevertheless the inventor of the present invention has found that slow addition of an aqueous solution or slurry of the polyuronic acid to a methanol solution containing the glyceryl poly(oxypropylene) triamine and a small amount of water results in the formation of a homogeneous solution. Some of the methanol may be replaced with higher alcohols including ethanol, n-propanol, and isopropanol without disrupting the homogeneity of the final mixture, Methanol, however, appears to be an essential component.

Polyuronic Acid Derivatives According to the Second Embodiment of the Present Invention The polyuronic acid derivative according to the second embodiment of the present invention is that two to six polyuronic acids are covalently attached by reductively amination, through reducing termini of the polyuronic acid, to glyceryl poly(oxypropylene) triamine As is similar to the polyuronic acid according to the first embodiment of the present invention or it adds to that, there are several important considerations with regard to this type of covalent attachment by reductively amination as described below.

As to the first consideration, it is that both the glyceryl poly(oxypropylene) triamine and the polyuronic acid starting materials are complex mixtures of molecules. For the glyceryl poly(oxypropylene) triamine, the primary element of complexity is the total number of propylene oxide units per molecule. Typically an approximately Gaussian distribution centered around a peak value is observed. A secondary element of complexity, for a given fixed total number of propylene oxide units, is the distribution of the numbers of propylene oxide units among the three poly(oxypropylene) chains, which extend from the three structurally different glyceryl hydroxyls. For the polyuronic acid, the only element of complexity is the total number of uronic acid units per molecule, if impurity saccharides are ignored. Within this specification, for purposes of simplification, the poly(oxypropylene) triamine and the polyuronic acid starting materials are treated as average structures with average molecular weights. Nevertheless, one must not forget that one is combining complex mixtures. That is, for extreme combinations, such as (1) a high degree of polymerization triamine with polyuronic acids having low degrees of polymerization or (2) a low degree of polymerization triamine with polyuronic acids having high degrees of polymerization, the resulting products may have characteristics which differ significantly from that of the "average" product resulting from a combination of two "average" starting materials. However, as long as the extreme combinations function as negligible components of the product mixtures, they can be ignored for purposes of discussion.

It follows from the above discussion that the product dispersant of the present invention will by necessity be a complex mixture. Theoretically one could use expensive and time-consuming separation methods on both the starting materials in order to obtain pure fractions and then carry out additional expensive and time-consuming separation methods on the product in order to obtain pure fractions. Such fractionation is neither economically practical nor necessary from the standpoint of the performance of the dispersant product.

From the standpoint of the aqueous solubility of the dispersant product, the necessity for attaching two or more polyuronic acids per glyceryl poly(oxypropylene) triamine molecule is manifested when the solvating power of only one covalently attached polyuronic acid is insufficient to solubilize the one-to-one product. Two extreme cases can be considered: (1) the average molecular weight of the polyuronic acid starting material is relatively small and (2) the average molecular weight of the glyceryl poly(oxypropylene) triamine is relatively large. For polyuronic acids with number average molecular weights at or near the lower range of the present invention specification, aqueous solubility of the one-to-one product is not expected. Similarly, for glyceryl poly(oxypropylene) triamines at the higher end of the range, such as Jeffamine T-5000 with an average sum, x+y+z, equal to about 80, the inventor of the present invention has found that two or more polyuronic acids must be covalently attached to the triamine in order to obtain aqueous solubility. Although in theory a maximum of six polyuronic acids can be covalently attached by reductive amination to a single glyceryl poly(oxypropylene) triamine, the preferred level of covalent attachment for the present invention is two. This level of double attachment leaves one of the three original primary amines unmodified such that it is free to facilitate adsorption of the hydrophobic portion of the dispersant onto the surface of the pigment particle.

A very important consideration for realizing the covalent attachment of two or more polyuronic acids to a single glyceryl poly(oxypropylene) triamine is that the reaction preferably carried out under homogeneous conditions. Because the polyuronic acid component is hydrophilic and the glyceryl poly(oxypropylene) triamine component is by design hydrophobic, finding a compatible solvent medium is potentially problematic. The inventor of the present invention has found that slow addition of an aqueous solution of the polyuronic acid to an aqueous methanol solution containing a large excess of the glyceryl poly(oxypropylene) triamine results in the formation of a homogeneous solution.

For the purpose of achieving a homogeneous reaction solution, such that two or more polyuronic acids can be covalently attached to a single glyceryl poly(oxypropylene) triamine, the inventor of the present invention has found that strongly polar non-aqueous solvents are efficacious. Useful solvents in this class include dimethyl sulfoxide (DMSO), sulfolane, 1,3-dimethyl-2-imidazolidinone (DMI), and N-methyl-2-pyrrolidinone (NMP). To facilitate the dissolution of the polyuronic acids in these strongly polar solvents, the addition of a relatively small amount of trifluoroacetic acid, a non-aqueous strong acid, has been found to be useful. Similarly, to facilitate the dissolution of the glyceryl poly(oxypropylene) triamine, the addition of a low-molecular-weight-alcohol cosolvent has been found to be useful. In a preferred method, separate solutions are prepared containing the appropriate stoichiometric quantities of the polyuronic acid and the glyceryl poly(oxypropylene) triamine starting materials. The solutions are then combined and mixed thoroughly. After a sufficient time period has elapsed, such that complete or near complete glycosylamination has been achieved, the reductive amination reaction is carried out.

The reductive amination step may be carried out using any method known to one skilled in the art. This reaction preferably carried out in homogeneous reactant solution as described above. Reductive amination is conveniently carried out homogeneously using borane complexes, borohydride or cyanoborohydride salts. Typically used borane complexes include borane-ammonia complex, borane-tert-butylamine complex, borane-N,N-diethylaniline complex, borane-N,N-diisopropylethylamine complex, borane-dimethylamine complex, borane-N-ethyl-N-isopropylaniline complex, borane-4-ethylmorpholine complex, borane-morpholine complex, borane-pyridine complex, borane-triethylamine complex, and borane-trimethylamine complex. Typically used borohydride salts include sodium borohydride, potassium borohydride, lithium borohydride, tetramethylammonium borohydride, and tetrabutylammonium borohydride. Typically used cyanoborohydride salts include sodium cyanoborohydride, potassium cyanoborohydride, lithium cyanoborohydride, and tetrabutylammonium cyanoborohydride.

Another convenient and selective method is heterogeneous catalytic hydrogenation using metal catalysts. Typical metal catalysts include any of the Group VIII metals, with nickel, palladium, platinum, and ruthenium being preferred. The metal catalysts may be used in either supported or unsupported forms. Hydrogen pressures are greater than 100 psi ($6.895 \times 10^5$ Pa), and more preferably greater than 700 psi ($4.827 \times 10^6$ Pa). Reaction temperatures are in the range of 10° C. to 100° C., and more preferably in the range 30° C. to 60° C. Less selective reagents for reductive amination which may be used include 1) zinc and hydrogen chloride gas, 2) iron pentacarbonyl and alcoholic potassium hydroxide, and 3) formic acid.

In the polyuronic acid derivative according to the first embodiment of the present invention, isolation of the product is easily accomplished by evaporating the reaction solvent and then washing the reaction product with a solvent that will selectively dissolve the unreacted glyceryl poly(oxypropylene) triamine, but will not dissolve the product. The unreacted glyceryl poly(oxypropylene) triamine may be recovered and used again as a starting material. After washing, the glyceryl poly(oxypropylene) triamine-free product may be dissolved in water with or without the addition of a neutralizing base.

In the polyuronic acid derivative according to the second embodiment of the present invention, isolation of the product may be accomplished by any method known in the art. When the reductive amination is carried out using soluble borane complexes or borohydride salts, a preferred first step in isolating the product is exhaustive evaporation of the reaction solvent under reduced pressure. Finally, the reaction product is washed with a solvent, which will selectively dissolve incompletely reacted reducing agents and their reaction products, and then dried. When the reductive amination is carried out using heterogeneous catalytic hydrogenation, the product is isolated similarly to that above after first removing the insoluble hydrogenation catalysts by filtration. Alkaline solution as products is prepared by using suitable base (example is shown below).

Subsequent purification of the resulting aqueous solution by ultrafiltration is preferred where purity of the product is a major consideration.

All of the reaction and isolation process steps may be carried out as batch processes or continuous processes according to methods known to those skilled in the art.

The polyuronic acid derivatives according to the present invention are similar to the derivatives claimed in U.S. Pat. No. 6,242,529, with the major difference being that the derivatives of the present invention may be prepared from a low-cost hydrophobic polymer, a glyceryl poly(oxypropylene) triamine. Furthermore, the derivatives of the present invention may be prepared simply using the low-cost hydrophobic polymer without modification in a one-step reductive amination reaction.

Pigment Dispersed Aqueous Ink Composition

The pigment dispersed aqueous ink composition according to the third embodiment of the present invention comprises a water as a principal solvent, a pigment, and a polyuronic acid derivative according to the first or second embodiment of the present invention as described above.

The amount of pigment dispersion comprising polyuronic acid derivetives in the ink composition is about 0.1% to 20% by weight and more preferably 0.1 to 10% by weight.

The components of the ink composition except the polyuronic acid above are described below.

<Pigment>

The pigment in the ink composition according to the present invention comprises at least one selected from the group consisting organic or inorganic pigments. The term "pigment" as used herein means an insoluble colorant.

The pigment particles are sufficiently small to permit free flow of the pigment-dispersed ink through the ink-jet printing device, especially through the ejecting nozzles, which typically have a diameter, ranging from 10 to 50 microns. The particle diameter of the pigment is preferably 10 microns or less and more preferably 0.1 microns or less.

The selected pigment may be used in dry or wet form. Usually pigments are manufactured in aqueous media and the resulting pigment is obtained as a water wet presscake. In this presscake form, the pigment is not agglomerated to the extent that it is in a dry form. For preparing pigment dispersions, pigments in wet presscake form do not require as much deflocculation as do dry pigments.

Pigments of the present invention may include the following: Symuler Fast Yellow GF (Dainippon Ink; C.I. Pigment Yellow 12), Symuler Fast Yellow GRF (Dainippon Ink; C.I. Pigment Yellow 13), Symuler Fast Yellow 5GF (Dainippon Ink; C.I. Pigment Yellow 14), Irgalite Yellow CG (Ciba-Geigy; C.I. Pigment Yellow 16), Symuler Fast Yellow HGF (Dainippon Ink; C.I. Pigment Yellow 17), Symuler Fast Yellow 4117 (Dainippon Ink; C.I. Pigment Yellow 73), Symuler Fast Yellow 4191N (Dainippon Ink; C.I. Pigment Yellow 74), Symuler Fast Yellow 4181 (Dainippon Ink; C.I. Pigment Yellow 83), Chromophthal Yellow 3G (Ciba-Geigy; C.I. Pigment Yellow 93), Chromophthal Yellow GR (Ciba-Geigy; C.I. Pigment Yellow 95), Symuler Fast Yellow 4186 (Dainippon Ink; C.I. Pigment Yellow 97), Hansa Brilliant Yellow 10GX (Hoechst Celanese; C.I. Pigment Yellow 98), Permanent Yellow G3R-01 (Hoechst Celanese; C.I. Pigment Yellow 114), Chromophthal Yellow 8G (Ciba-Geigy; C.I. Pigment Yellow 128), Irgazin Yellow 5GT (Ciba-Geigy; C.I. Pigment Yellow 129), Hostaperm Yellow H4G (Hoechst Celanese; C.I. Pigment Yellow 151), Symuler Fast Yellow 4192 (Dainippon Ink; C.I. Pigment Yellow 154), Hostaperm Orange GR (Hoechst Celanese; C.I. Pigment Orange 43), Paliogen Orange (BASF; C.I. Pigment Orange 51), Symuler Brilliant Carmine (Dainippon Ink; C.I. Pigment Red 57:1), Fastogen Super Magenta (Dainippon Ink; C.I. Pigment Red 122), Paliogen Red L3870 (BASF; C.I. Pigment Red 123), Hostaperm Scarlet GO (Hoechst Celanese; C.I. Pigment Red 168), Permanent Rubine F6B (Hoechst Celanese; C.I. Pigment Red 184), Monastral Magenta (Ciba-Geigy; C.I. Pigment Red 202), Monastral Scarlet (Ciba-Geigy; C.I. Pigment Red 207), Fastogen Blue GP-100 (Dainippon Ink; C.I. Pigment Blue 15:2), Fastogen Blue GNPR (Dainippon Ink; C.I. Pigment Blue 15:3), Fastogen Blue GNPS (Dainippon Ink; C.I. Pigment Blue 15:4), Micracet Blue R (Ciba-Geigy; C.I. Pigment Blue 60), Fastogen Green S (Dainippon Ink; C.I. Pigment Green 7), Fastogen Green 2YK (Dainippon Ink; C.I. Pigment Green 36), Fastogen Super Red (Dainippon Ink; C.I. Pigment Violet 19), Fastogen Super Violet (Dainippon Ink; C.I. Pigment Violet 23), Monastral Maroon RT-229-D (Ciba-Geigy; C.I. Pigment Violet 42), Raven 1170 (Columbian Chemicals; C.I. Pigment Black 7), Special Black 4A (Degussa; C.I. Pigment Black 7), S160 (Degussa; C.I. Pigment Black 7), S170 (Degussa; C.I. Pigment Black 7), FW 18 (Degussa; C.I. Pigment Black 7), and FW 18 (Degussa; C.I. Pigment Black 7).

The amount of pigment in the ink composition of the present invention is about 0.1% to 30% by weight and more preferably 0.1 to 20% by weight.

<Water>

Water is the principal solvent for the pigment dispersed aqueous ink compositions of the present invention. Additional components, which may be included in the ink compositions, are given below. The amount of the aqueous carrier medium in the ink composition of the present invention is 70 to 99.8% by weight.

<Base>

To solubilize the polyuronic acid segments of the pigment dispersion in the aqueous medium, it may be necessary to neutralize some or all of the carboxylic acid functions. Bases, which are suitable for this purpose, include organic bases, alkanolamines, alkali metal hydroxides, and mixtures thereof. Examples of suitable bases include the following: methylamine, dimethylamine, trimethylamine, morpholine, N-methylmorpholine, monoethanolamine, diethanolamine, triethanolamine, N-methyl-monoethanolamine, N,N-dimethyl-monoethanolamine, N-methyl-diethanolamine, tri-isopropanolamine, tetramethylammonium hydroxide, ammonia, lithium hydroxide, sodium hydroxide, potassium hydroxide, rubidium hydroxide, and cesium hydroxide.

<Water-Soluble Cosolvents>

In addition to the above-described components, the inks may contain, optionally, one or more water-soluble organic solvents. Water-soluble organic solvents are well known in the art and include: (1) alcohols such as isopropyl alcohol, butyl alcohols, etc. (2) ketones such as acetone, methyl ethyl ketone, etc. (3) ethers such as tetrahydrofuran, dioxane, etc. (4) esters such as ethyl acetate, propylene carbonate, etc. (5) polyhydric alcohols such as ethylene glycol, propylene glycol, butylene glycol, diethylene glycol, triethylene glycol, polyethylene glycol, polypropylene glycol, 1,5-pentanediol, 1,2-pentanediol, 1,2-hexanediol, 1,2,6-hexanetriol, 1,2-heptanediol, thiodiglycol, glycerol, etc. (6) lower alkyl ethers of polyhydric alcohols such as ethylene glycol monomethyl ether, ethylene glycol monoethyl ether, ethylene glycol mono-n-propyl ether, ethylene glycol mono-isopropyl ether, ethylene glycol mono-n-butyl ether, ethylene glycol mono-sec-butyl ether, ethylene glycol mono-isobutyl ether, ethylene glycol mono-tert-butyl ether, ethylene glycol mono-n-amyl ether, ethylene glycol mono-n-hexyl ether, propylene glycol monomethyl ether, propylene glycol monoethyl ether, propylene glycol mono-n-propyl ether, propylene glycol mono-isopropyl ether, propylene glycol mono-n-butyl ether, propylene glycol mono-sec-butyl ether, propylene glycol mono-isobutyl ether, propylene glycol mono-tert-butyl ether, diethylene glycol monomethyl ether, diethylene glycol monoethyl ether, diethylene glycol mono-n-propyl ether, diethylene glycol mono-isopropyl ether, diethylene glycol mono-n-butyl ether, dipropylene glycol monomethyl ether, dipropylene glycol monoethyl ether, dipropylene glycol mono-n-propyl ether and dipropylene glycol mono-n-butyl ether, etc. (7) nitrogen containing compounds such as urea, pyrrolidone, N-methyl-2-pyrrolidone, etc. (8) sulfur containing compounds such as dimethylsulfoxide, tetramethylene sulfoxide, etc. No particular limitation is imposed on the total amount of cosolvent to be used in the ink. Preferably it is present in a range of 0.5 to 40 wt. %.

<Other Components>

In addition to the above-described components, the inks may contain, optionally, one or more penetrability-imparting surfactants selected from the group consisting of anionic or non-ionic surfactants. Examples of anionic surfactants include fatty acid salts, higher alcohol sulfuric ester salts, alkylbenzene sulfonates, and higher alcohol phosphoric ester salts. Examples of nonionic surfactants include ethylene oxide adducts of acetylenic diols, ethylene oxide adducts of higher alcohols, ethylene oxide adducts of alkylphenols, aliphatic ethylene oxide adducts, ethylene oxide adducts of higher alcohol fatty acid esters, ethylene oxide adducts of higher alkyl amines, ethylene oxide adducts of fatty acid amides, ethylene oxide adducts of polypropylene glycol, fatty acid esters of polyhydric alcohols, alkanolamine fatty acid amides and ethylene oxide-propylene oxide copolymers. Preferably used are the acetylenic diols or ethylene oxide adducts of acetylenic diols, which are available from Air Products and Chemicals, Inc., Allentown, Pa., 18195, USA. Examples include Surfynol 104 (tetramethyl decynediol), Surfynol 465 (ethoxylated tetramethyl decynediol), Surfynol CT-136 (acetylenic diol and anionic surfactant blend), Surfynol GA (acetylenic diol blend) and Surfynol TG (acetylenic diol blend in ethylene glycol). Also preferably used are the ethoxylated and/or propoxylated silicone surfactants, which are available from BYK Chemie GmbH, Germany. No particular limitation is imposed on the amount of penetrability-imparting surfactant to be used in the ink. Preferably it is present in a range of 0.01 to 5 wt. %. In addition to the above penetrability-imparting surfactants, the inks may contain additives such as is pH buffers, biocides, viscosity modifiers, ultraviolet ray absorbers, corrosion inhibitors and antioxidants. The amounts of all components of the ink are selected such that the viscosity of the ink is less than 10 cps at 20° C.

Pigment Self-Dispersed Aqueous Ink Composition

The Pigment dispersed aqueous ink composition according to the present invention comprises water as a principal solvent, a self-dispersed pigment, and a polyuronic acid derivative according to the first or second embodiment of the present invention as described above.

The amount of polyuronic acid derivetives in the ink composition is about 0.1% to 20% by weight and more preferably 0.1 to 10% by weight.

The components of the ink composition except the polyuronic acid above are described below.

<Self-Dispersed Pigment>

The self-dispersed pigment of the present invention comprises at least one selected from the group consisting of self-dispersed organic or self-dispersed inorganic pigments, wherein the vehicle for the self-dispersed pigment is water. Although generally the term "pigment" is used to mean an insoluble colorant, the smaller particle size fractions of self-dispersed pigments can be difficult to distinguish from a soluble colorant, such as a dye. Specifically, a non-negligible fraction of a self-dispersed pigment can be resistant to complete separation form the aqueous vehicle when the self-dispersed pigment dispersion is subjected to large centrifugal forces such as those generated in an ultracentrifuge. Nevertheless, for the purpose of a general definition, the term "pigment" as used herein refers to a colorant that is substantially an insoluble colorant, wherein substantially means greater than 95% by weight.

The term "self-dispersed," when used to modify pigments is defined herein to mean a pigment which does not require dispersing agents, such as polymeric dispersants or surfactants, to produce stable dispersions of the pigment in the aqueous vehicle. The stability of such dispersions is indicated by the constancy of their physical characteristics—viscosity, surface tension, pH, and particle size—with respect to time under actual conditions or under accelerated aging conditions. Because typical pigments have densities greater than water, it is inevitable that some settling will occur over time. High settling rates are indicative of poor stability. For dispersions with high settling rates, changes in physical characteristics concomitant with settling will be readily measurable. Suitably low settling rates—for example, less than 10% per year—indicates a high degree of stability. A defining characteristic of a self-dispersed pigment is that the aqueous dispersion containing the self-dispersed pigment will have a surface tension very close to that of water, 72 dynes/cm at 25° C. Polymeric dispersants and surfactants tend to lower the surface tension of the unadulterated pigment dispersion to values less than 60 dynes/cm at 25° C.

The pigment upon which the self-dispersed pigment is based may be selected from the following group of pigments listed below.

For black pigments, carbon blacks produced by any known processes, such as contact, furnace, gas, and thermal processes, may be used. Examples include Raven 1170 (Columbian Chemicals; C.I. Pigment Black 7), Special Black 4A (Degussa; C.I. Pigment Black 7), S160 (Degussa; C.I. Pigment Black 7), 5170 (Degussa; C.I. Pigment Black 7), FW 18 (Degussa; C.I. Pigment Black 7), FW 200 (Degussa; C.I. Pigment Black 7), Raven 5000 (Columbian Chemicals; C.I. Pigment Black 7), Raven 3500 (Columbian Chemicals; C.I. Pigment Black 7), CD 2038 (Columbian Chemicals; C.I. Pigment Black 7), CD 7035 (Columbian Chemicals; C.I. Pigment Black 7), CD 6026 (Columbian Chemicals; C.I. Pigment Black 7), CD 7004 (Columbian Chemicals; C.I. Pigment Black 7), MA 100 (Mitsubishi Chemical; C.I. Pigment Black 7), #45 (Mitsubishi Chemical; C.I. Pigment Black 7), Vulcan XC72R (Cabot; C.I. Pigment Black 7), Monarch 1000 (Cabot; C.I. Pigment Black 7), and Monarch 880 (Cabot; C.I. Pigment Black 7).

For non-black color pigments, any organic color pigment may be used without any particular limitation. Examples of organic color pigments, usable as pigments upon which the self-dispersed pigments may be based, include azo, phthalocyanine, quinacridone, isoindolinone, dioxazine, benzimidazolone, anthraquinone, indanthrone, and perylene pigments. Pigments of the present invention may include the following: Symuler Fast Yellow GF (Dainippon Ink; C.I. Pigment Yellow 12), Symuler Fast Yellow GRF (Dainippon Ink; C.I. Pigment Yellow 13), Symuler Fast Yellow 5GF (Dainippon Ink; C.I. Pigment Yellow 14), Irgalite Yellow CG (Ciba-Geigy; C.I. Pigment Yellow 16), Symuler Fast Yellow HGF (Dainippon Ink; C.I. Pigment Yellow 17), Symuler Fast Yellow 4117 (Dainippon Ink; C.I. Pigment Yellow 73), Symuler Fast Yellow 4191N (Dainippon Ink; C.I. Pigment Yellow 74), Symuler Fast Yellow 4181 (Dainippon Ink; C.I. Pigment Yellow 83), Chromophthal Yellow 3G (Ciba-Geigy; C.I. Pigment Yellow 93), Chromophthal Yellow GR (Ciba-Geigy; C.I. Pigment Yellow 95), Symuler Fast Yellow 4186 (Dainippon Ink; C.I. Pigment Yellow 97), Hansa Brilliant Yellow 10GX (Hoechst Celanese; C.I. Pigment Yellow 98), Permanent Yellow G3R-01 (Hoechst Celanese; C.I. Pigment Yellow 114), Chromophthal Yellow 8G (Ciba-Geigy; C.I. Pigment Yellow 128), Irgazin Yellow 5GT (Ciba-Geigy; C.I. Pigment Yellow 129), Hostaperm Yellow H4G (Hoechst Celanese; C.I. Pigment Yellow 151), Symuler Fast Yellow 4192 (Dainippon Ink; C.I. Pigment Yellow 154), Toner Yellow HG (Clariant; C.I. Pigment Yellow 180), Hostaperm Orange GR (Hoechst Celanese; C.I. Pigment Orange 43), Paliogen Orange (BASF; C.I.

Pigment Orange 51), Symuler Brilliant Carmine (Dainippon Ink; C.I. Pigment Red 57:1), Fastogen Super Magenta (Dainippon Ink; C.I. Pigment Red 122), Toner Magenta EO (Clariant; C.I. Pigment Red 122), Paliogen Red L3870 (BASF; C.I. Pigment Red 123), Hostaperm Scarlet GO (Hoechst Celanese; C.I. Pigment Red 168), Permanent Rubine F6B (Hoechst Celanese; C.I. Pigment Red 184), Monastral Magenta (Ciba-Geigy; C.I. Pigment Red 202), Monastral Scarlet (Ciba-Geigy; C.I. Pigment Red 207), Fastogen Blue GP-100 (Dainippon Ink; C.I. Pigment Blue 15:2), Fastogen Blue GNPR (Dainippon Ink; C.I. Pigment Blue 15:3), Toner Cyan B (Clariant; C.I. Pigment Blue 15:3), Fastogen Blue GNPS (Dainippon Ink; C.I. Pigment Blue 15:4), Micracet Blue R (Ciba-Geigy; C.I. Pigment Blue 60), Fastogen Green S (Dainippon Ink; C.I. Pigment Green 7), Fastogen Green 2YK (Dainippon Ink; C.I. Pigment Green 36), Fastogen Super Red (Dainippon Ink; C.I. Pigment Violet 19), Fastogen Super Violet (Dainippon Ink; C.I. Pigment Violet 23), and Monastral Maroon RT-229-D (Ciba-Geigy; C.I. Pigment Violet 42).

The self-dispersed pigment of the present invention may be prepared by any method known in the art such that charged functionalities are deliberately introduced onto the surface of the pigment particles in sufficient numbers. Without intending to be limiting in regard to the present invention, methods for introducing charged functionalities on pigment surfaces include the following: oxidation by hypochlorite salts, oxidation by permanganate salts, oxidation by chlorate salts, oxidation by persulfate salts, oxidation by nitric acid, oxidation by ozone, coupling reactions with aryl diazonium salts that contain charged functional groups, and sulfonation by sulfonating reagents. Commercially available black self-dispersed pigment dispersions are available from Cabot Corporation in two different product versions: CAB-O-JET 200 (a sulfonated carbon black) and CAB-O-JET 300 (a carboxylated carbon black). Another commercially available black self-dispersed pigment dispersion is Bonjet Black CW-1, which is produced by Orient Chemical.

According to a preferred embodiment of the present invention, the self-dispersed pigment has an average particle size within the range 50 to 200 nanometers. The amount of self-dispersed pigment in the ink composition of the present invention is about 0.1% to 30% by weight and more preferably 0.1 to 20% by weight.

<Water, Base, Water-soluble Cosolvents, and Other Components>

With regard to water, base, water-soluble cosolvents, and other components, the same components as described for the ink composition according to the third embodiment of the present invention can be used.

<Ink Preparation>

The ink composition according to the third embodiment of the present invention may be prepared in one step by dispersing and mixing the above described components using an acceptable method. Alternatively, the ink composition may be prepared in two steps by 1) dispersing and mixing some of the above described components and then 2) adding the remaining components to the dispersion and mixing. The dispersing step may be accomplished using a ball mill, a sand mill, an atrittor, a mini-mill, a roll mill, an agitator mill, a Henschel mixer, a colloid mill, an ultrasonic homogenizer, a jet mill, or an angmill to obtain a homogeneous dispersion.

It may be desirable to prepare first the pigmented ink in a concentrated form and then subsequently dilute the concentrated dispersion to a concentration appropriate for use in the ink jet printer. Also, it is generally desirable to filter the pigment dispersed aqueous ink composition, preferably using a metal mesh filter or a membrane filter. Filtration may be accomplished by applying pressure to the ink composition being filtered or by reducing the pressure on the receiving end of the filtration device. Centrifugal separation may also be used to remove large particles that may cause obstruction of the nozzles on the print head of the ink jet printer.

The ink composition according to the forth embodiment of the present invention may be prepared simply by mixing the above-described components using any acceptable method. In a preferred embodiment, after combining the components, the ink composition is heated with stirring at a temperature greater than 50° C. for a brief period of time such that an ink with an unchanging viscosity is obtained. In another preferred embodiment, after combining the components, the ink composition is subjected to ultrasonication in an ultrasonication bath for a brief period of time such that an ink with an unchanging viscosity is obtained. After completing the above-described stabilizing treatments or a similar treatment, it is desirable to remove any large particles from the ink by filtration. This is preferably carried out using metal mesh filters or membrane filters. Filtration may be accomplished by applying pressure to the ink being filtered or by reducing the pressure on the receiving end of the filtration device. Prior to filtration, centrifugal separation may be used to remove excessively large particles.

Without intending to be bound by theory, it is believed that the ink composition described herein gives reliable printing performance and yields printed images that have excellent print quality as a result of a favorable interaction between the polyuronic acid derivative, in which a glyceryl poly(oxypropylene) triamine is reductively aminated to the reducing terminus of the polyuronic acid, and the self-dispersed pigment. That an interaction between these two main components occurs is evidenced by a small viscosity rise that occurs when the freshly prepared ink mixture is heated or treated ultrasonically as described above as a preferred embodiment for ink preparation. Oligo-oxypropylene polymers are known to have decreased aqueous solubility as the temperature of the aqueous medium is increased. The glyceryl poly(oxypropylene) triamine segment of the polyuronic acid derivative, in which polyuronic acid is attached by reductively amination, through reducing terminus of the polyuronic acid, to glyceryl poly(oxypropylene) triamine, is expected to exhibit similar behavior. By heating the mixture (bulk increased temperature) or treating the mixture ultrasonically (localized increased temperature), the glyceryl poly(oxypropylene) triamine segment is made less compatible with the aqueous medium and more compatible with any hydrophobic species, which may be present. In the ink composition of the present invention, the self-dispersed pigment component is such a hydrophobic species. Although the surfaces of self-dispersed pigments are more hydrophilic than comparable unmodified pigments, the degree of surface functionalization is still relatively small and the bulk of the pigment surface is considerably hydrophobic. Thus, it is not unreasonable that an interaction occurs between these two main ink components when the ink mixture is heated in the bulk or locally. The relatively high molecular weight of the poly(oxypropylene) triamine segment hinders dissociation of the poly(oxypropylene) triamine segment after interaction and subsequent adsorption occurs. Thus, on the time scale of ink storage and/or ink usage (several years), the initial small viscosity rise is not reversed and an unchanging ink viscosity is obtained.

Without intending to be bound by theory, it is believed that the ink composition according to the present invention gives reliable printing performance because the self-dispersed pigment retains the useful characteristics of an unmodified self-dispersed pigment even after adsorption onto the pigment surface by the polyuronic acid derivative according to the present invention. As noted above, the use of self-dispersed pigments is one of the most general approaches for obtaining reliable printing performance using aqueous pigment-based inks. The excellent water solubility of the polyuronic acid segment is such that, not only are the useful characteristics of a self-dispersed pigment retained, the stability of the self-dispersed-pigment/polyuronic-acid-derivative combination is expected to be enhanced.

Without intending to be bound by theory, it is believed that the ink composition according to the present invention yields excellent print quality on plain paper because the self-dispersed pigment retains the useful characteristics of an unmodified self-dispersed pigment as noted above. The inclusion of the polyuronic acid derivative, in which polyuronic acid is attached by reductively amination, through reducing terminus of the polyuronic acid, results in only a small viscosity rise for the ink formulation as noted above. As a consequence of this small viscosity rise, inks of the present invention may be formulated with the relatively high pigment contents that are typical of inks containing unmodified self-dispersed pigments. High pigment contents translate into high optical densities on plain paper, a defining characteristic for excellent plain-paper print quality.

Furthermore, without intending to be bound by theory, it is believed that the ink composition according to the present invention yields excellent print quality on coated specialty media that exhibit lustrousness as a result of a favorable adsorption onto the surface of the self-dispersed pigment by the polyuronic acid derivative, in which polyuronic acid is attached by reductively amination, through reducing terminus of the polyuronic acid, to glyceryl poly(oxypropylene) triamine. In contrast to the water-based resins, emulsion additives, water-soluble emulsions, soluble and/or dispersed polymers, and acrylic resins given as examples of the prior art, the polyuronic acid derivative, in which polyuronic acid is attached by reductively amination, through reducing terminus of the polyuronic acid, to glyceryl poly(oxypropylene) triamine, may be forcibly adsorbed onto the surface of the self-dispersed pigments as described above. The adsorbed polyuronic acid, in which polyuronic acid is attached by reductively amination, through reducing terminus of the polyuronic acid, to glyceryl poly(oxypropylene) triamine, is able then to function as a glaze for improving the lustrousness of the printed images on coated specialty media. Because the form of the self-dispersed-pigment/polyuronic-acid-derivative combination is similar to that of non-self-dispersed pigment dispersions, lustrousness and adhesion comparable to that of non-self-dispersed pigment dispersions are obtained.

EXAMPLES

The present invention will be further described in more detail with reference to the following examples, though it is not limited to these examples only.

1. Preparation of Pigment Dispersion Comprising Polyuronic Acid Derivative According to the First Embodiment (1) Preparation of Polyguluronic Acid A four neck 1 L round bottom flask equipped with a thermometer, an overhead mechanical stirrer, and a condenser was placed snugly into a variable temperature controlled heating mantle. 600 g of 81% formic acid (prepared from deionized water and 88% reagent grade formic acid from Kanto Chemicals, Japan) was transferred to the flask. Next, the formic acid was warmed to 90° C. with gentle stirring. While stirring vigorously, 45 g of apple pectin (Classic AM 201, Herbstreith & Fox, Switzerland) was added gradually to the hot formic acid using a powder funnel. The fourth neck of the flask was sealed with a glass stopper after quickly purging the system with a brisk flow of nitrogen. After the purge, a nitrogen inlet adapter connected to an oil bubbler was fitted to the top of the condenser and a slow controlled flow of nitrogen through the oil bubbler was started. The pectin completely dissolved after stirring vigorously for 60 minutes. Next, the solution was heated to reflux while stirring the solution moderately. The heating at reflux and stirring were continued for 5 hours and then the solution was allowed to cool to about 40° C. The warm solution was filtered through a #1 Whatman filter into a 1 L Erlenmeyer flask in order to remove a small amount of brown insoluble impurities. The collected filtrate was transferred to a 1 L pear-shaped flask. Using a rotary evaporator with a circulating-type aspirator and a water bath setting of 60° C., the solvent was evaporated until a viscous light brown oil remained in the flask. 700 mL of ethanol was added to the flask resulting in the immediate precipitation of an off-white crystalline solid. The solid was collected by filtration through a fine porosity (pore size: 16–40 microns) fritted glass filter using an aspirator to reduce the pressure in the collecting flask. The solid was washed twice with approximately 400 mL portions of ethanol and then set aside to air dry. Finally, the solid was dried under vacuum to a constant weight. The yield of product was 14.5 g. The degree of polymerization of the product was determined to be 21.2 using the method of P. A. Shaffer and M. Somogyi (J. Biol. Chem., 100, 695–713 (1933)). The product also was characterized by $^1$H NMR in dimethyl-$d_6$ sulfoxide ($(CD_3)_2SO$) and trifluoroacetic acid-$d_1$ ($CF_3CO_2D$) and by $^{13}$C NMR in $D_2O$. Both spectra are consistent with a mixture of high purity polygalacturonic acids.

(2) Preparation of Polyguluronic Acid 150 g of alginic acid (Ultra Low Viscosity Alginic Acid; Kibun Food Chemiphar; Tokyo, Japan) was slurried in 450 mL of deionized water in a 1000 mL beaker. To this slurry was added 28.0 g of lithium hydroxide monohydrate, while stirring the slurry with an overhead mechanical stirrer. The alginic acid dissolved to yield a solution with a pH value of approximately 4.15. Deionized water was added to give a total solution volume of 600 mL. Next, 100 g of 31 wt. % hydrogen peroxide solution and 2 mL of n-nonyl alcohol, as a defoaming agent, were added with stirring. A 40 mL solution containing 0.65 g of ferrous sulfate heptahydrate was freshly prepared and added to the alginic-acid/hydrogen peroxide solution with stirring. The solution was stirred vigorously for four hours during which time a substantial exotherm occurred and then subsided. While the solution was still warm (about 40° C.), an additional 20 g of 31 wt. % hydrogen peroxide solution was added with stirring. While stirring the solution vigorously for an additional two hours, a mild exotherm occurred. Next, the mixture was heated at 60° C. for 30 minutes and then filtered hot through a sheet of #1 Whatman filter paper. After cooling to room temperature, the filtrate solution was transferred to a 1 L pear-shaped flask. Using a rotary evaporator and a water bath setting of 60° C., the solution was concentrated to a volume of about 250 mL. Next, the solution was transferred to a 1 L beaker along with water washings, which brought the total volume up to 300 mL. While stirring the solution vigorously, 300 mL of glacial acetic acid was added slowly which resulted in the precipitation of a solid. The solid that precipitated was collected by vacuum filtration using a fine porosity (pore size: 16–40 microns) fritted glass filter. The wet solid was transferred to a 1 L beaker along with approximately 100 mL of deionized water. The solid and water were stirred vigorously such that a homogeneous slurry was obtained. While continuing to stir the slurry, 800 mL of 95% ethanol was added. After stirring for 1 hour, the solid was collected by vacuum filtration using a fine porosity (pore size: 16–40 microns) fritted glass filter. The solid was washed with several portions of 95% ethanol and then set aside to air dry. Finally, the solid was dried under vacuum to a constant weight. The yield of product was 18.5 g. The degree of polymerization was determined to be 13.2 using the method of R A. Shaffer and M. Somogyi as described above. The product also was characterized by $^1$H NMR in dimethyl-$d_6$ sulfoxide (($CD_3$)$_2$SO) and trifluoroacetic acid-$d_1$ ($CF_3CO_2D$). The spectrum was consistent with a mixture of pure polyguluronic acid and a mixed polyuronic acid, which was mostly guluronic acid, but also contained a small amount of mannuronic acid impurity. The guluronic acid content of the mixed product was greater than 85%.

(3) Preparation of Polyuronic Acid Derivative A1: glyceryl poly(oxypropylene) triamine Reductively Aminated to Polygalacturonic Acid 40 g of polygalacturonic acid, prepared as described above, was slurried in 200 mL of deionized water in a 200 mL beaker. While stirring with a magnetic stir bar, the mixture was heated to about 50° C. such the most of the polygalacturonic acid dissolved. 200 g of glyceryl poly (oxypropylene) triamine (Jeffamine XJT-509, x+y+z, equal to about 50, Huntsman Corporation, Performance Chemicals Division, Houston, Tex., USA), a football-type magnetic stir bar, 1200 g of methanol, and 200 g of deionized water were added to a 2 L beaker. Upon stirring the solution using a magnetic stirrer, a homogeneous solution was obtained. While stirring the methanolic glyceryl poly(oxypropylene) triamine solution, the warm aqueous slurry of polygalacturonic acid was added quickly to the methanolic glyceryl poly(oxypropylene) triamine solution. While stirring the mixture continuously for 2 hours, a homogeneous brown solution was obtained. The beaker was covered with a plastic wrap and set aside to stand for 60 hours. Next, roughly two-thirds of the polygalacturonic-acid/glyceryl-poly(oxypropylene)-triamine solution was transferred to a 1 L pear-shaped flask. Using a rotary evaporator and a water bath setting of 70° C., the solution was concentrated to a volume of about 350 mL. After disconnecting, the pear-shaped flask from the rotary evaporator, the remaining one-third of the polygalacturonic-acid/glyceryl-poly(oxypropylene)-triamine solution was transferred to the pear-shaped flask. Again, using the rotary evaporator and a water bath setting of 70° C., the solution was concentrated until no further volatile solvents were collected and a dark brown oil remained in the 1 L pear-shaped flask. The oil was washed with three 500 mL portions of 75% methanol/25% ethanol with the washings being discarded. As a consequence of the washings, the oil partially solidified. The tacky brown solid was dissolved in a mixed solution containing 950 mL of methanol and 300 mL of 98% formic acid and then transferred to a 2 L beaker. While stirring the solution using a magnetic stirrer and a football-type magnetic stir bar, 20 g of borane-dimethyl amine complex was added. The complex dissolved immediately and the combined solution was stirred for an additional 36 hours. During this time the color of the solution lightened considerably. Next, using the rotary evaporator and a water bath setting of 70° C., as described above, the solution was concentrated to a solution volume of 400 mL. Next, 600 mL of deionized water, 600 mL of isopropanol, and 200 mL of 98% formic acid was added to the solution and the combined solution was transferred to a 2 L flask. While stirring the solution, the solution was purified by ultrafiltration using a Millipore Minitan system configured with twelve polysulfone plates having a membrane pore size rating of 10,000 molecular weight. The purified liquid was re-circulated to the original container while the glyceryl-poly(oxypropylene)-triamine-containing liquid permeate, which passed through the membrane, was collected for disposal. Additional deionized water/isopropanol/formic-acid solution was added periodically to the 2 L flask to compensate for the liquid permeate being removed. In the course of the ultrafiltration, the solution was concentrated to a volume of about 500 mL. The combined volume of collected liquid permeate was about 5 liters. The resulting purified solution was filtered under pressure through a 5-micron membrane filter to remove a small amount of solid impurity. The volatile solvents were evaporated from the filtrate using the rotary evaporator and a water bath setting of 70° C., as described above. A light brown oil remained that was further dried to a constant weight using an oil-type vacuum pump. The yield of product was 57.5 g. A 300 mL flask was loaded with 30.0 g of the dried solid and 150 g of deionized water. The mixture was stirred vigorously with warming to approximately 40° C. and solid lithium hydroxide was added gradually until most of the solid dissolved and the pH of the mixture was approximately 7.5. While monitoring the pH of the mixture, an aqueous solution of lithium hydroxide monohydrate (5 wt. %) was added dropwise with stirring until the pH reached a constant value of 8.5. Additional water was added such that a total solution weight of 200 g was obtained. For the final step, the resulting solution was filtered through a 5-micron membrane filter.

The polyuronic acid derivative A1 thus obtained was used as the pigment dispersant A1.

(4) Preparation of Polyuronic Acid Derivative B1: glyceryl poly(oxypropylene) triamine Reductively Aminated to Polyguluronic Acid 40 g of polyguluronic acid, prepared as described above, was slurried in 200 mL of deionized water in a 200 mL beaker. 200 g of glyceryl poly(oxypropylene) triamine (Jeffamine XJT-509, x+y+z, equal to about 50, Huntsman Corporation, Performance Chemicals Division, Houston, Tex., USA), a football-type magnetic stir bar, 1000 g of methanol, and 200 g of deionized water were added to a 2 L beaker. Upon stirring the solution using a magnetic stirrer, a homogeneous solution was obtained. While stirring the methanolic glyceryl poly(oxypropylene) triamine solution, the aqueous slurry of polyguluronic acid was added quickly to the methanolic glyceryl poly(oxypropylene) triamine solution. While stirring the mixture continuously for 2 hours, a homogeneous brown solution was obtained. The beaker was covered with a plastic wrap and set aside to stand for 60 hours. Next, roughly two-thirds of the polyguluronic-acid/glyceryl-poly(oxypropylene)-triamine solution was transferred to a 1 L pear-shaped flask. Using a rotary evaporator and a water bath setting of 70° C., the solution was concentrated to a volume of about 300 mL. After disconnecting, the pear-shaped flask from the rotary evaporator, the remaining one-third of the polyguluronic-acid/glyceryl-poly(oxypropylene)-triamine solution was transferred to the pear-shaped flask. Again, using the rotary evaporator and a water bath setting of 70° C., the solution was concentrated until no further volatile solvents were collected and a dark brown oil remained in the 1 L pear-shaped flask. The oil was washed with three 500 mL portions of 75% methanol/25% ethanol with the washings being discarded. As a consequence of the washings, the oil partially solidified. The tacky brown solid was dissolved in a mixed solution containing 950 mL of methanol and 300 mL of 98% formic acid and then transferred to a 2 L beaker. While stirring the solution using a magnetic stirrer and a football-type magnetic stir bar, 20 g of borane-dimethyl amine complex was added. The complex dissolved immediately and the combined solution was stirred for an additional 36 hours. During this time the color of the solution lightened considerably. Next, using the rotary evaporator and a water bath setting of 70° C., as described above, the solution was concentrated until no further volatile solvents were collected and a dark brown oil remained in the 1 L pear-shaped flask. Next, 800 mL of deionized water, 600 mL of isopropanol, and 200 mL of 98% formic acid was added to the solution and the combined solution was transferred to a 2 L flask. While stirring the solution, the solution was purified by ultrafiltration using a Millipore Minitan system configured with twelve polysulfone plates having a membrane pore size rating of 10,000 molecular weight. The purified liquid was re-circulated to the original container while the glyceryl-poly(oxypropylene)-triamine-containing liquid permeate, which passed through the membrane, was collected for disposal. Additional deionized water/isopropanol/formic-acid solution was added periodically to the 2 L flask to compensate for the liquid permeate being removed. In the course of the ultrafiltration, the solution was concentrated to a volume of about 500 mL. The combined volume of collected liquid permeate was about 5 liters. The resulting purified solution was filtered under pressure through a 5-micron membrane filter to remove a small amount of solid impurity. The volatile solvents were evaporated from the filtrate using the rotary evaporator and a water bath setting of 70° C., as described above. A light brown oil remained that was further dried to a constant weight using an oil-type vacuum pump. The yield of product was 52.8 g. A 300 mL flask was loaded with 30.0 g of the dried solid and 150 g of deionized water. The mixture was stirred vigorously with warming to approximately 40° C. and solid lithium hydroxide was added gradually until most of the solid dissolved and the pH of the mixture was approximately 7.5. While monitoring the pH of the mixture, an aqueous solution of lithium hydroxide monohydrate (5 wt. %) was added dropwise with stirring until the pH reached a constant value of 8.8. Additional water was added such that a total solution weight of 200 g was obtained. For the final step, the resulting solution was filtered through a 5-micron membrane filter.

The polyuronic acid derivative B1 thus obtained was used as the pigment dispersant B1.

2. Preparation of Pigment Dispersant Comprising the Polyuronic Acid Derivative According to the Second Embodiment (1) Preparation of Polygalacturonic Acid A four neck 1 L round bottom flask equipped with a thermometer, an overhead mechanical stirrer, and a condenser was placed snugly into a variable temperature controlled heating mantle. 600 g of 81% formic acid (prepared from deionized water and 88% reagent grade formic acid from Kanto Chemicals, Japan) was transferred to the flask. Next, the formic acid was warmed to 90° C. with gentle stirring. While stirring vigorously, 45 g of apple pectin (Classic AM 201, Herbstreith & Fox, Germany) was added gradually to the hot formic acid using a powder funnel. The fourth neck of the flask was sealed with a glass stopper after quickly purging the system with a brisk flow of nitrogen. After the purge, a nitrogen inlet adapter connected to an oil bubbler was fitted to the top of the condenser and a slow controlled flow of nitrogen through the oil bubbler was started. The pectin completely dissolved after stirring vigorously for 30 minutes. Next, the solution was heated to reflux while stirring the solution moderately. The heating at reflux and stirring were continued for 90 minutes and then the solution was allowed to cool to about 40° C. The warm solution was filtered through a #1 Whatman filter into a 1 L Erlenmeyer flask in order to remove a small amount of brown insoluble impurities. The collected filtrate was transferred to a 1 L pear-shaped flask. Using a rotary evaporator with a circulating-type aspirator and a water bath setting of 60° C., the solvent was evaporated until a viscous light brown oil remained in the flask. 700 mL of ethanol was added to the flask resulting in the immediate precipitation of an off-white crystalline solid. The solid was collected by filtration through a fine porosity (pore size: 16–40 microns) fritted glass filter using an aspirator to reduce the pressure in the collecting flask. The solid was washed twice with approximately 400 mL portions of ethanol and then set aside to air dry. Finally, the solid was dried under vacuum to a constant weight. The yield of product was 32.7 g. The product was characterized by $^1$H NMR in dimethyl-$d_6$ sulfoxide (($CD_3$)$_2$SO) and trifluoroacetic acid-$d_1$ ($CF_3CO_2D$) and by $^{13}$C NMR in $D_2O$. Both spectra are consistent with a mixture of high purity polygalacturonic acids. As a rough measure of the average molecular weight of the product, gel permeation chromatographic analysis was carried out with respect to malto-oligomer and dextran standards. A Hitachi Model L-6000 pump was used in combination with a Gasukuro Kogyo Model 556 constant temperature oven, a Shodex Model RI SE-52 refractive index detector, and a Hitachi Model D2520 GPC integrator. The analysis was performed using a TSK-GEL G3000PW$_{XL}$ column (7.8 mm i.d.×30 cm) with a preceding TSK PW$_{XL}$ Guard Column (6 mm i.d.×4 cm). The eluant was a phosphate buffer (pH 7) that was 0.06 molar in sodium dihydrogen phosphate dihydrate and 0.036 molar in sodium hydroxide. The flow rate was 0.8 mL/minute and the columns were maintained at 25° C. Samples were prepared in the eluant at concentrations of 1 wt. %; the injection volume was 40 microliters. Standard solutions of maltotriose, maltotetrose, maltopentose, dextran 1080 g/mole, dextran 4440 g/mole, and dextran 9890 g/mole were used to construct a reference curve. With respect to the reference curve, the average molecular weight of the polygalacturonic acid sample was approximately 7300 g/mole.

(2) Preparation of Polyguluronic Acid 150 g of alginic acid (Ultra Low Viscosity Alginic Acid; Kibun Food Chemiphar; Tokyo, Japan) was slurried in 450 mL of deionized water in a 1000 mL beaker. To this slurry was added 28.0 g of lithium hydroxide monohydrate, while stirring the slurry with an overhead mechanical stirrer. The alginic acid dissolved to yield a solution with a pH value of approximately 4.15. Deionized water was added to give a total solution volume of 600 mL. Next, 100 g of 31 wt. % hydrogen peroxide solution and 2 mL of n-nonyl alcohol, as a defoaming agent, were added with stirring. A 40 mL solution containing 0.65 g of ferrous sulfate heptahydrate was freshly prepared and added to the alginic-acid/hydrogen peroxide solution with stirring. The solution was stirred vigorously for four hours during which time a substantial exotherm occurred and then subsided. While the solution was still warm (about 40° C.), the solution was filtered hot through a sheet of #1 Whatman filter paper. After cooling to room temperature, the filtrate solution was transferred to a 1 L pear-shaped flask. Using a rotary evaporator and a water bath setting of 60° C., the solution was concentrated to a volume of about 250 mL. Next, the solution was transferred to a 1 L beaker along with water washings, which brought the total volume up to 300 mL. While stirring the solution vigorously, 300 mL of glacial acetic acid was added slowly which resulted in the precipitation of a solid. The solid that precipitated was collected by vacuum filtration using a fine porosity (pore size: 16–40 microns) fritted glass filter. The wet solid was transferred to a 1 L beaker along with approximately 100 mL of deionized water. The solid and water were stirred vigorously such that a homogeneous slurry was obtained. While continuing to stir the slurry, 800 mL of 95% ethanol was added. After stirring for 1 hour, the solid was collected by vacuum filtration using a fine porosity (pore size: 16–40 microns) fritted glass filter. The solid was washed with several portions of 95% ethanol and then set aside to air dry. Finally, the solid was dried under vacuum to a constant weight. The yield of product was 18.5 g. The product was characterized by $^1$H NMR in dimethyl-$d_6$ sulfoxide $((CD_3)_2SO)$ and trifluoroacetic acid-$d_1$ $(CF_3CO_2D)$. The spectrum was consistent with a mixture of pure polyguluronic acid and a mixed polyuronic acid, which was mostly guluronic acid, but also contained a small amount of mannuronic acid impurity. The guluronic acid content of the mixed product was greater than 85%. As a rough measure of the average molecular weight of the product, gel permeation chromatographic analysis was carried out with respect to malto-oligomer and dextran standards, as described above. With respect to the reference curve, the average molecular weight of the polyguluronic acid sample was approximately 6200 g/mole.

(3) Preparation of Pigment Dispersant A Comprising the Polyuronic Acid Derivative A2: glyceryl poly(oxypropylene) triamine Reductively Aminated to the Reducing Termini of Two or More Polygalacturonic Acids 60 g of the polygalacturonic acid, prepared as described above, and was slurried in a solution of 6 g of trifluoroacetic acid in 450 mL of 1,3-dimethyl-2-imidazolidinone contained in a 1 L beaker. While stirring with a magnetic stir bar, the mixture was heated to about 50° C. such that nearly all of the polygalacturonic acid dissolved. While stirring with a magnetic stir bar, 40 g of glyceryl poly(oxypropylene) triamine (JeffamineT-5000, x+y+z, equal to about 80, Huntsman Corporation, Performance Chemicals Division, Houston, Tex., USA) was dissolved in 200 mL of 1,3-dimethyl-2-imidazolidinone contained in a 500 mL beaker. While stirring the polygalacturonic acid solution vigorously, the solution of glyceryl poly(oxypropylene) triamine was added quickly to the polygalacturonic acid solution. The resulting homogeneous light brown solution was transferred to a 1 L wide-mouthed polyethylene sample bottle. The neck of the sample bottle was wrapped with Teflon tape and the bottle was capped and sealed tightly. The sample bottle was stored in a 40° C. constant temperature oven for 48 hours. The sample bottle was removed from the oven and set aside to cool to room temperature. The cooled sample bottle was opened and 15 g of borane-dimethylamine complex was added and the mixture swirled to bring about dissolution of the borane complex. The sample bottle was sealed as before and stored in the same 40° C. constant temperature oven for 22 hours. During the 22-hour period, a significant amount of solid had precipitated from the solution. The sample bottle was removed from the oven and set aside to cool to room temperature. The cooled sample bottle was opened and trifluoroacetic acid was added in small portions followed by agitation of the mixture until a homogeneous solution was again achieved. The added amount of trifluoroacetic acid was approximately 10 g. The sample bottle was sealed as before and stored in the same 40° C. constant temperature oven for 48 hours. The sample bottle was removed from the oven and set aside to cool to room temperature. The cooled sample bottle was opened and the contents were poured into 4 L of vigorously stirred isopropanol contained in a 5 L beaker. Using a pH meter to monitor the pH of the mixture, 10 wt. % lithium hydroxide solution was added dropwise to the well-stirred mixture until the pH value of the mixture was greater than about 8. The stirred mixture was set aside to settle for 15 hours. The light yellow supernatant, which had separated, was removed by decantation and discarded. Isopropanol was added to the mixture to bring the total volume up to 4.5 L and the mixture was stirred vigorously for 2 hours and then set aside to stand for 21 hours. This general process—decantation of the supernatant, addition of isopropanol, stirring, and standing—was repeated three times. After standing, the nearly colorless supernatant was removed and discarded as before. The remaining mixture was homogenized by treating the mixture contained in the 5 L beaker in an ultrasonication bath for 30 minutes. The product solid was isolated by centrifuging the mixture in 50 mL tubes at 20,000 rpm for 8 minutes. The centrifuge tubes were placed in a well-ventilated draft hood for 24 hours. During this short drying period the solid separated from the centrifuge tube walls. The partially dried solid was transferred to a sample bottle and dried under vacuum to a constant weight. The yield of crude product was 88 g. The crude product was dissolved in 800 mL of deionized water and filtered through a 0.2-micron membrane filter. The filtrate was transferred to a 1 L flask. While stirring the solution, the solution was purified by ultrafiltration using a Millipore Pellicon 2 Mini system configured with a single regenerated cellulose plate having a membrane pore size rating of 10,000 Daltons (Part # P2C010C01). The purified solution was recirculated to the original container while the impurity containing permeate solution was collected for disposal. Additional deionized water was added periodically to the 1 L flask to compensate for the permeate solution being removed. In the course of the ultrafiltration, the solution was concentrated to a final volume of about 400 mL. The combined volume of collected permeate solution was about 5 liters. Using a pH meter to monitor the solution pH, 5 wt. % lithium hydroxide solution was added dropwise to the solution while stirring until the pH value reached 8.9. The resulting solution was filtered under pressure through a 0.2-micron membrane filter to remove a small amount of solid impurity. Two grams of the solution were accurately weighed and then heated to dryness and constant weight in a 70° C. constant temperature oven. The dried sample was accurately weighed and from the difference between the original weight and the dried weight, the concentration of solids in the solution was calculated. The polyuronic acid derivative A2 having a concentration of solids in the solution of 14.6 wt. % was obtained.

The polyuronic acid derivative A2 thus obtained was used as the pigment dispersant A.

(4) Preparation of Pigment Dispersant B Comprising the Polyuronic Acid Derivative B2: glyceryl poly(oxypropylene) triamine Reductively Aminated to the Reducing Termini of Two or More Polyguluronic Acids 56 g of the polyguluronic acid, prepared as described above, and was slurried in a solution of 6 g of trifluoroacetic acid in 450 mL of 1,3-dimethyl-2-imidazolidinone contained in a 1 L beaker. While stirring with a magnetic stir bar, the mixture was heated to about 50° C. such that nearly all of the polyguluronic acid dissolved. While stirring with a magnetic stir bar, 44 g of glyceryl poly(oxypropylene) triamine (JeffamineT-5000, x+y+z, equal to about 80, Huntsman Corporation, Performance Chemicals Division, Houston, Tex., USA) was dissolved in 200 mL of 1,3-dimethyl-2-imidazolidinone contained in a 500 mL beaker. While stirring the polyguluronic acid solution vigorously, the solution of glyceryl poly(oxypropylene) triamine was added quickly to the polyguluronic acid solution. The resulting homogeneous light brown solution was treated from this point in the same way as that described above for the preparation of Pigment Dispersion A2. The yield of crude Pigment Dispersion B product was 84.5 g. The calculated concentration of Pigment Dispersion B solids in the final solution of was 14.3 wt. %.

The polyuronic acid derivative B2 thus obtained was used as the pigment dispersant B.

(5) Pigment Dispersant C1 (Comparative Example)

[45] Joncryl 62 (SC Johnson Polymer; acrylic resin solution; 34 wt. % solids) was used as is for preparing pigment dispersant.

(6) Pigment Dispersant D1 (Comparative Example)

The polymer dispersant used in this comparative example was a butyl methacrylate//methyl methacrylate/methacrylic acid block copolymer (BMA//MMA/MA) prepared according to the method described in U.S. Pat. No. 5,085,698. The block copolymer was neutralized with potassium hydroxide and diluted such that a solution containing 25 wt. % solids was obtained. This solution was filtered through a 5-micron membrane filter to prepare the pigment dispersant D1.

3. Preparation of Pigment Dispersion 30 g of the pigment, the pigment dispersant above, and a deionized water were mixed in the ratio which is shown in Table 1, and the mixture was dispersed in an Eiger Motormill M250 VSE-EXJ (Eiger Japan, Tokyo, JAPAN). Glass beads (diameter: 1.0 mm), which had a total combined volume of 175 mL, were used as the milling media. Milling was carried out at 4500 rpm for a period of 30 hours.

The yield of the pigment dispersion was about 200 g. The dispersion combinations shown in Table 1 below were prepared. For all of the dispersions, the average particle size was between 100 and 120 nanometers.

TABLE 1

| Pigment Dispersion | Pigment | Pigment Dispersant Solution (weight) | Deionized Water (weight) |
|---|---|---|---|
| Black A1 | Black FW 18 (Degussa) | Pigment Dispersant A1 (100 g) | 120 g |
| Black B1 | Black FW 18 (Degussa) | Pigment Dispersant B1 (100 g) | 120 g |
| Cyan A1 | Toner Cyan B (Clariant) | Pigment Dispersant A1 (120 g) | 100 g |
| Cyan B1 | Toner Cyan B (Clariant) | Pigment Dispersant B1 (120 g) | 100 g |
| Yellow A1 | Toner Yellow HG (Clariant) | Pigment Dispersant A1 (120 g) | 100 g |
| Yellow B1 | Toner Yellow HG (Clariant) | Pigment Dispersant B1 (120 g) | 100 g |
| Magenta A1 | Toner Magenta EO (Clariant) | Pigment Dispersant A1 (120 g) | 100 g |
| Magenta B1 | Toner Magenta EO (Clariant) | Pigment Dispersant B1 (120 g) | 100 g |
| Comp. Ex. Black C | Black FW 18 (Degussa) | Pigment Dispersant C1 (44 g) | 176 g |
| Black D (Comparative Example) | Black FW 18 (Degussa) | Pigment Dispersant D1 (60 g) | 160 g |
| Cyan D (Comparative Example) | Toner Cyan B (Clariant) | Pigment Dispersant D1 (72 g) | 148 g |
| Black A2 | Black FW 18 (Degussa) | Pigment Dispersant A2 (103 g) | 117 g |
| Black B2 | Black FW 18 (Degussa) | Pigment Dispersant B2 (105 g) | 115 g |
| Cyan A2 | Toner Cyan B (Clariant) | Pigment Dispersant A2 (123 g) | 97 g |
| Cyan B2 | Toner Cyan B (Clariant) | Pigment Dispersant B2 (126 g) | 94 g |
| Yellow A2 | Toner Yellow HG (Clariant) | Pigment Dispersant A2 (123 g) | 97 g |
| Yellow B2 | Toner Yellow HG (Clariant) | Pigment Dispersant B2 (126 g) | 94 g |
| Magenta A2 | Toner Magenta EO (Clariant) | Pigment Dispersant A2 (123 g) | 97 g |
| Magenta B2 | Toner Magenta EO (Clariant) | Pigment Dispersant B2 (126 g) | 94 g |

4. Preparation of Ink Composition

The pigment dispersion thus above, a deionized water, and 1 g of Surfynol 465 (ethylene oxide adduct of an acetylenic diol; Air Products) were added sequentially to a beaker with stirring. The combined mixture was stirred for 3 hours.

Next, the mixture was filtered through an 8-micron membrane filter, such that an ink suitable for ink jet printing was obtained.

The content of each component is shown in Table 2 and 3. In Table 2 and 3, the abbreviations show the following cosolvents.

gly; glycerol
DEG; diethylene glycol
TEG; triethylene glycol
TeEG; tetraethylene glycol
DEG-mBE; diethylene glycol mono-n-butyl ether
TEG-mBE; triethylene glycol mono-n-butyl ether and
HD; 1,2-hexanediol.

TABLE 2

| Sample | Pigment Dispersion (weight) | | Water (weight) | Cosolvents (weight) | |
|---|---|---|---|---|---|
| Example 1a-1 | Black A1 | 50 g | 27.5 g | Gly | (12 g) |
| | | | | TEG | (5 g) |
| | | | | HD | (4 g) |
| | | | | DEG-mBE | (0.5 g) |
| Example 2a-1 | Black A1 | 50 g | 30 g | Gly | (11 g) |
| | | | | TeEG | (4 g) |
| | | | | HD | (3 g) |
| | | | | DEG-mBE | (1 g) |
| Example 3a-1 | Black B1 | 50 g | 29.5 g | gly | (11.5 g) |
| | | | | TEG | (4 g) |
| | | | | HD | (3 g) |
| | | | | DEG-mBE | (1 g) |
| Example 4a-1 | Black B1 | 50 g | 26 g | Gly | (11.5 g) |
| | | | | TEG | (4 g) |
| | | | | HD | (5 g) |

TABLE 2-continued

| Sample | Pigment Dispersion (weight) | | Water (weight) | Cosolvents (weight) | |
|---|---|---|---|---|---|
| Example 9a-1 | Cyan A1 | 34 g | 35 g | Gly<br>TEG<br>DEG-mBE | (14 g)<br>(4 g)<br>(5 g) |
| Example 10a-1 | Cyan B1 | 32 g | 37 g | Gly<br>TeEG<br>HD<br>DEG-mBE | (20 g)<br>(5 g)<br>(3 g)<br>(2 g) |
| Example 15a-1 | Yellow A1 | 40 g | 30 g | Gly<br>DEG<br>HD<br>DEG-mBE | (18 g)<br>(7 g)<br>(2 g)<br>(2 g) |
| Example 16a-1 | Yellow B1 | 42 g | 26 g | Gly<br>DEG<br>DEG-mBE | (21 g)<br>(7 g)<br>(5 g) |
| Example 17a-1 | Magenta A1 | 45 g | 29 g | gly<br>TEG<br>DEG-mBE | (15 g)<br>(5 g)<br>(5 g) |
| Example 18a-1 | Magenta B1 | 45 g | 33 g | gly<br>TEG<br>HD<br>DEG-mBE | (13 g)<br>(4 g)<br>(3 g)<br>(1 g) |
| Comparative Example 1a-1 | Black C (Comparative Example) | 50 g | 30 g | gly<br>TEG<br>HD<br>DEG-mBE | (11 g)<br>(4 g)<br>(3 g)<br>(1 g) |
| Comparative Example 2a-1 | Black D (Comparative Example) | 50 g | 29 g | gly<br>TEG<br>HD<br>DEG-mBE | (12 g)<br>(4 g)<br>(3 g)<br>(1 g) |
| Comparative Example 3a-1 | Cyan D (Comparative Example) | 32 g | 37 g | gly<br>TEG<br>HD<br>DEG-mBE | (20 g)<br>(5 g)<br>(3 g)<br>(5 g) |

TABLE 3

| Sample | Pigment Dispersion (weight) | | Water (weight) | Cosolvents (weight) | |
|---|---|---|---|---|---|
| Example 1b-1 | Black A2 | 50 g | 27.5 g | Gly<br>TeEG<br>HD<br>TEG-mBE | (12 g)<br>(4 g)<br>(3 g)<br>(1 g) |
| Example 2b-1 | Black A2 | 50 g | 30 g | Gly<br>TeEG<br>HD<br>TEG-mBE | (12 g)<br>(5 g)<br>(2.5 g)<br>(1.5 g) |
| Example 3b-1 | Black B2 | 50 g | 29.5 g | gly<br>TeEG<br>DEG<br>HD<br>DEG-mBE | (12.5 g)<br>(2 g)<br>(2.5 g)<br>(2.5 g)<br>(1 g) |
| Example 4b-1 | Black B2 | 50 g | 26 g | Gly<br>TEG<br>HD<br>EG-mBE | (13 g)<br>(7 g)<br>(1.5 g)<br>(5 g) |
| Example 9b-1 | Cyan A2 | 34 g | 35 g | Gly<br>TEG<br>DEG-mBE | (20 g)<br>(5 g)<br>(5 g) |
| Example 10b-1 | Cyan B2 | 32 g | 37 g | Gly<br>TEG<br>HD<br>TEG-mBE | (20 g)<br>(5 g)<br>(2.5 g)<br>(2 g) |
| Example 15b-1 | Yellow A2 | 40 g | 30 g | Gly<br>TEG<br>HD<br>DEG-mBE | (18 g)<br>(7 g)<br>(2 g)<br>(3 g) |
| Example 16b-1 | Yellow B2 | 42 g | 26 g | Gly<br>TeEG<br>DEG<br>DEG-mBE | (21 g)<br>(2 g)<br>(3 g)<br>(5 g) |
| Example 17b-1 | Magenta A2 | 45 g | 29 g | gly<br>TEG<br>DEG-mBE | (15 g)<br>(5 g)<br>(5 g) |
| Example 18b-1 | Magenta B2 | 45 g | 33 g | gly<br>TEG<br>HD<br>TEG-mBE | (13 g)<br>(4 g)<br>(3 g)<br>(1 g) |
| Comparative Example 1b-1 | Black C (Comparative Example) | 50 g | 30 g | gly<br>TEG<br>HD<br>DEG-mBE | (11 g)<br>(4 g)<br>(3 g)<br>(1 g) |
| Comparative Example 2b-1 | Black D (Comparative Example) | 50 g | 29 g | gly<br>TEG<br>HD<br>DEG-mBE | (12 g)<br>(4 g)<br>(3 g)<br>(1 g) |
| Comparative Example 3b-1 | Cyan D (Comparative Example) | 32 g | 37 g | gly<br>TEG<br>DEG-mBE | (20 g)<br>(5 g)<br>(5 g) |

5. Evaluation

The ink compositions thus above were evaluated according as to their overall reliability and print quality on plain paper.

(1) Continuous Printing Test

The reliability under continuous printing conditions of the above inks was evaluated as follows. First, the ink was degassed and sealed in a heat-sealable aluminum pack. Next, the ink was loaded into the black-ink print head of a PM-900C printer (Product Name, Seiko Epson Corporation). A line pattern which uses all of the nozzles was printed initially to establish that ink was being ejected from all nozzles with good directionality (angular deviation of an ejected ink droplet from a nozzle is within about ±0.50 from the normal to the plane of the nozzle). The printing pattern was changed to a 360 dots per inch solid block pattern that fills an A4 size sheet of paper. This printing speed was relatively fast such that about 4 pages were completed per minute. The block and line pattern was printed continuously with a printed sheet being evaluated every 100 sheets for evidence of loss of directionality, clogged nozzles, or decreases in optical density of the solid blocks (less than 5%). For all of the inks tested, except Comparative Example 1, no loss of directionality, no clogged nozzles, and no decreases in optical density were observed for 10,000 printed sheets, a level which indicates an acceptable level of reliability. For Comparative Example 1, loss of directionality occurred at less than 5000 sheets.

(2) Long Term Storage Test

The reliability towards long-term storage in the print head of the above inks was evaluated as follows. First, the ink was degassed and sealed in a heat-sealable aluminum pack. Next, the ink was loaded into the black ink print head of an MJ-510C printer (Product Name, Seiko Epson Corporation). A line pattern, which uses all of the nozzles, was printed initially to establish that ink was being ejected from all nozzles with good directionality. Next, the ink supply was removed from the print head, and then the print head was removed from the printer. The uncapped print head was stored for 4 days at 40° C. in a constant temperature oven. The print head was reattached to the printer and the ink supply was reattached to the print head. The cleaning operation of the printer was executed followed by a line pattern that uses all of the nozzles. The cleaning operation followed by the line pattern was repeated until all of the nozzles printed with good directionality. For all of the inks tested, except Comparative Example 1, the number of cleaning operations necessary for full recovery was less than or equal to 4, a level which indicates an acceptable level of reliability. For Comparative Example 1, full recovery of all the nozzles was not obtained even after 10 cleaning operations.

(3) Thermal Cycling Test

The reliability towards two temperature extremes (−30° C. and 60° C.) of the above inks was evaluated as follows. First, the ink was degassed and sealed in a 30 mL glass sample bottle. The sample bottle was loaded into a 60° C. constant temperature oven and stored at that temperature condition for 24 hours. The sample was removed from the oven and transferred to a −30° C. constant temperature refrigerator and stored at that temperature condition for 24 hours. This two-temperature cycle was repeated such that a total of ten cycles was completed. After the last cycle, the ink was thawed to room temperature, the glass sample bottle was inverted without shaking, and the bottom of the sample bottle was examined for precipitates. For all of the inks tested, except Comparative Example 1, no precipitates were observable, a level which indicates an acceptable level of reliability. For Comparative Example 1, precipitate was observed.

(4) Drying Time Test

The drying time of the above inks was evaluated by printing a series of solid block patterns and wiping the patterns in 5-second increments. The printing was carried out using a PM-930C printer (Product Name, Seiko Epson Corporation) and Xerox 4024 as the paper. For all of the inks tested the drying time was less than 5 seconds, a level that indicates acceptably fast drying.

(5) Print Quality Test

Print quality, using a PM-930C printer (Product Name, Seiko Epson Corporation), was evaluated in the following way. A standard set of Japanese Kanji characters were printed using a Gothic and a Minchou font at a 4-point character size. The samples were printed at 720 dpi using Xerox 4024 paper as a representative plain paper. The print samples were evaluated using an optical microscope. The following standards were used to evaluate the print quality:

A: the Kanji characters were sharp with no filling of interior voids within the characters, B: the Kanji characters were sharp, but there was some filling of interior voids within characters with stroke counts greater than about 15, and NG: the Kanji characters were not sharp and there was significant filling of interior voids within characters with stroke counts greater than about 10.

The results of the print quality tests are shown below in Table 4.

TABLE 4

| Sample | Print Quality | Sample | Print Quality |
| --- | --- | --- | --- |
| Example 1a-1 | A | Example 1b-1 | A |
| Example 2a-1 | A | Example 2b-1 | A |
| Example 3a-1 | A | Example 3b-1 | A |
| Example 4a-1 | A | Example 4b-1 | A |
| Example 5a-1 | A | Example 5b-1 | A |
| Example 6a-1 | A | Example 6b-1 | A |
| Example 7a-1 | A | Example 7b-1 | A |
| Example 8a-1 | A | Example 8b-1 | A |
| Example 9a-1 | A | Example 9b-1 | A |
| Example 10a-1 | A | Example 10b-1 | A |

TABLE 4-continued

| Sample | Print Quality | Sample | Print Quality |
| --- | --- | --- | --- |
| Example 11a-1 | A | Example 11b-1 | A |
| Example 12a-1 | A | Example 12b-1 | A |
| Example 13a-1 | A | Example 13b-1 | A |
| Example 14a-1 | A | Example 14b-1 | A |
| Example 15a-1 | A | Example 15b-1 | A |
| Example 16a-1 | A | Example 16b-1 | A |
| Example 17a-1 | A | Example 17b-1 | A |
| Example 18a-1 | A | Example 18b-1 | A |
| Comparative Example 1a-1 | NG | Comparative Example 1b-1 | C |
| Comparative Example 2a-1 | B | Comparative Example 2b-1 | B |
| Comparative Example 3a-1 | B | Comparative Example 3b-1 | B |

As can be seen from the above results in Table 4, all of the inks of the present invention showed excellent results for the printing test on plain paper.

6. Preparation of Ink Composition According to the Forth Embodiment (1) Self-dispersed Pigment Black Pigment Dispersion A CAB-O-JET 300 was obtained from the Cabot Corporation as a 15% by weight dispersion.

Black Pigment Dispersion B

Bonjet Black CW-1 was obtained from Orient Chemical as a 15% by weight dispersion.

Black Pigment Dispersion C

A black pigment dispersion was prepared by a method analogous to that described in Example 2 in WO 01/94476 A2. FW-18 carbon black, obtained from the Degussa Corporation, was used as the pigment starting material. Ozone was generated using a GL-1 ozone generator manufactured by PCI Ozone Corporation. A Microfluidizer manufactured by Microfluidics Corporation was used to effect dispersive mixing of the pigment concurrent with ozone oxidation. The resulting dispersion was purified by ultrafiltration using a Pellicon Laboratory System obtained from the Millipore Corporation. The final concentration of the dispersion was 15% by weight. The average particle size of the dispersion, as measured using a Honeywell Microtrac® UPA 150 particle size analyzer, was 98 nanometers.

Yellow Pigment Dispersion

A yellow pigment dispersion was prepared by the following general method which is a modification of Treatment 2 as described in EP 0 894 835 B1. Dispersive mixing was carried out concurrent with the pigment surface reaction as described in WO 01/94476 A2. 20 parts of Novoperm Yellow P-HG, obtained from the Clariant Corporation, was used as the pigment starting material. The pigment was suspended and then dispersed in 550 parts of pyridine using a Microfluidizer manufactured by Microfluidics Corporation. Next, the mixture was heated to reflux and a water-containing distillation forerun was distilled off and discarded (about 10% of the total solvent volume). In a closed reaction system under an dry argon atmosphere, 10 parts of liquid sulfur trioxide were added gradually to the pigment dispersion in pyridine while heating the mixture at 110° C. During the addition of sulfur trioxide, the mixture was circulated through the Microfluidizer in order to effect dispersive mixing of the pigment concurrent with sulfonation. The addition and dispersive mixing processes were carried out continuously for a period of 6 hours. After cooling to room temperature the mixture was poured slowly into 5000 parts of an ice slurry while stirring the combined mixture vigorously. The mixture was transferred to a rotary evaporator and most of the pyridine was removed as an aqueous azeotrope such that an aqueous dispersion remained. While stirring the aqueous dispersion, a 5% by weight solution of potassium hydroxide was added dropwise until the pH of the dispersion was about 9. Next, the dispersion was purified and concentrated by ultrafiltration using a Pellicon Laboratory System obtained from the Millipore Corporation. The final concentration of the dispersion was 13% by weight. The average particle size of the dispersion was 110 nanometers.

Magenta Pigment Dispersion

A magenta pigment dispersion was prepared by a general method nearly the same as that described above for the yellow pigment dispersion. 20 parts of Fastogen Super Red, obtained from Dainippon Ink, was used instead of the yellow pigment. The addition and dispersive mixing processes were carried out continuously for a period of 10 hours. The final concentration of the dispersion was 12% by weight. The average particle size of the dispersion was 140 nanometers.

Cyan Pigment Dispersion

A cyan pigment dispersion was prepared by a general method nearly the same as that described above for the yellow pigment dispersion. 20 parts of Toner Cyan B, obtained from the Clariant Corporation, was used instead of the yellow pigment. The addition and dispersive mixing processes were carried out continuously for a period of 5 hours. The final concentration of the dispersion was 15% by weight. The average particle size of the dispersion was 95 nanometers.

(2) Preparation of Ink Composition

The pigment dispersion avobe, a deionized water, the polyuronic acid derivatives obtained above (A1 to B2), cosolvents, and 2 g of Surfynol 465 (ethylene oxide adduct of an acetylenic diol; Air Products) were added sequentially to a glass beaker with stirring. The combined mixture was stirred for one hour. While stirring the mixture gently using an overhead stirrer, the combined mixture was subjected to ultrasonication in an ultrasonication bath for 30 minutes. Next, the mixture was filtered through an 8-micron membrane filter, such that an ink suitable for ink jet printing was obtained.

The composition ratio of each component was shown in Table 5 and 6 (the units for the parenthetically listed quantities are grams).

TABLE 5

| Sample | Pigment Dispersion (weight) | | Water (weight) | Polyuronic acid derivative | Cosolvents (weight) | |
|---|---|---|---|---|---|---|
| Example 1a-2 | Black A | 94 g | 40 g | A1 | gly | (22 g) |
| | | | | | 2P | (4 g) |
| | | | | | TEG | (5 g) |
| | | | | | DEG-mBE | (1 g) |
| | | | | | HD | (6 g) |
| Example 2a-2 | Black A | 94 g | 40 g | B1 | gly | (21 g) |
| | | | | | 2P | (5 g) |
| | | | | | DEG | (5 g) |
| | | | | | TEG-mBE | (2 g) |
| | | | | | HD | (6 g) |

TABLE 5-continued

| Sample | Pigment Dispersion (weight) | | Water (weight) | Polyuronic acid derivative | Cosolvents (weight) | |
|---|---|---|---|---|---|---|
| Example 3a-2 | Black B | 94 g | 38 g | A1 | gly | (24 g) |
| | | | | | 2P | (4 g) |
| | | | | | TeEG | (5 g) |
| | | | | | TEG-mBE | (2 g) |
| | | | | | HD | (6 g) |
| Example 4a-2 | Black B | 94 g | 38 g | B1 | gly | (24 g) |
| | | | | | 2P | (4 g) |
| | | | | | TeEG | (5 g) |
| | | | | | TEG-mBE | (2 g) |
| | | | | | HD | (6 g) |
| Example 5a-2 | Black C | 87 g | 48 g | A1 | gly | (21 g) |
| | | | | | 2P | (4 g) |
| | | | | | TEG | (5 g) |
| | | | | | TEG-mBE | (2 g) |
| | | | | | HD | (6 g) |
| Example 6a-2 | Black C | 87 g | 48 g | B1 | gly | (21 g) |
| | | | | | 2P | (4 g) |
| | | | | | TEG | (5 g) |
| | | | | | TEG-mBE | (2 g) |
| | | | | | HD | (6 g) |
| Example 7a-2 | Yellow | 100 g | 26 g | A1 | gly | (27 g) |
| | | | | | 2P | (4 g) |
| | | | | | TEG | (7 g) |
| | | | | | TEG-mBE | (2 g) |
| | | | | | HD | (6 g) |
| Example 8a-2 | Yellow | 100 g | 26 g | B1 | gly | (28 g) |
| | | | | | 2P | (4 g) |
| | | | | | TeEG | (6 g) |
| | | | | | DEG-mBE | (4 g) |
| | | | | | HD | (6 g) |
| Example 9a-2 | Magenta | 92 g | 41 g | A1 | gly | (25 g) |
| | | | | | 2P | (3 g) |
| | | | | | TeEG | (5 g) |
| | | | | | TEG-mBE | (4 g) |
| | | | | | HD | (6 g) |
| Example 10a-2 | Magenta | 92 g | 41 g | B1 | gly | (25 g) |
| | | | | | 2P | (3 g) |
| | | | | | TeEG | (5 g) |
| | | | | | TEG-mBE | (4 g) |
| | | | | | HD | (6 g) |
| Example 11a-2 | Cyan | 54 g | 72 g | A1 | gly | (32 g) |
| | | | | | 2P | (5 g) |
| | | | | | DEG | (10 g) |
| | | | | | TEG-mBE | (4 g) |
| | | | | | HD | (6 g) |
| Example 12a-2 | Cyan | 54 g | 72 g | B1 | gly | (30 g) |
| | | | | | 2P | (5 g) |
| | | | | | DEG | (10 g) |
| | | | | | TEG-mBE | (4 g) |
| | | | | | HD | (6 g) |
| Comparative Example 1a-2 | Black A | 94 g | 61 g | — | gly | (25 g) |
| | | | | | 2P | (5 g) |
| | | | | | TEG | (5 g) |
| | | | | | DEG-mBE | (2 g) |
| | | | | | HD | (6 g) |
| Comparative Example 2a-2 | Black B | 94 g | 59 g | — | gly | (27 g) |
| | | | | | 2P | (5 g) |
| | | | | | TeEG | (5 g) |
| | | | | | TEG-mBE | (2 g) |
| | | | | | HD | (6 g) |

TABLE 5-continued

| Sample | Pigment Dispersion (weight) | | Water (weight) | Polyuronic acid derivative | Cosolvents (weight) | |
|---|---|---|---|---|---|---|
| Comparative Example 3a-2 | Black C | 94 g | 69 g | — | gly<br>2P<br>TEG<br>TEG-mBE<br>HD | (24 g)<br>(5 g)<br>(5 g)<br>(2 g)<br>(6 g) |
| Comparative Example 4a-2 | Yellow | 100 g | 46 g | — | gly<br>2P<br>TeEG<br>DEG-mBE<br>HD | (31 g)<br>(4 g)<br>(7 g)<br>(4 g)<br>(6 g) |
| Comparative Example 5a-2 | Magenta | 92 g | 59 g | — | gly<br>2P<br>TeEG<br>TEG-mBE<br>HD | (28 g)<br>(3 g)<br>(6 g)<br>(4 g)<br>(6 g) |
| Comparative Example 6a-2 | Cyan | 54 g | 85 g | — | gly<br>2P<br>DEG<br>TEG-mBE<br>HD | (34 g)<br>(5 g)<br>(10 g)<br>(4 g)<br>(6 g) |

TABLE 6

| Sample | Pigment Dispersion (weight) | | Water (weight) | Polyuronic acid derivative | Cosolvents (weight) | |
|---|---|---|---|---|---|---|
| Example 1b-2 | Black A | 94 g | 39 g | A2 | gly<br>2P<br>TeEG<br>TEG-mBE<br>HD | (25 g)<br>(6 g)<br>(5 g)<br>(4 g)<br>(5 g) |
| Example 2b-2 | Black A | 94 g | 37 g | B2 | gly<br>2P<br>TEG<br>TEG-mBE<br>HD | (26 g)<br>(6 g)<br>(5 g)<br>(4 g)<br>(5 g) |
| Example 3b-2 | Black B | 94 g | 40 g | A2 | gly<br>2P<br>TeEG<br>DEG-mBE<br>HD | (24 g)<br>(5 g)<br>(5 g)<br>(5 g)<br>(5 g) |
| Example 4b-2 | Black B | 94 g | 38 g | B2 | gly<br>2P<br>TeEG<br>DEG-mBE<br>HD | (25 g)<br>(5 g)<br>(5 g)<br>(5 g)<br>(5 g) |
| Example 5b-2 | Black C | 87 g | 39 g | A2 | gly<br>2P<br>DEG<br>TEG-mBE<br>HD | (26 g)<br>(5 g)<br>(7 g)<br>(6 g)<br>(4 g) |
| Example 6b-2 | Black C | 87 g | 37 g | B2 | gly<br>2P<br>DEG<br>TEG-mBE<br>HD | (27 g)<br>(4 g)<br>(7 g)<br>(6 g)<br>(4 g) |
| Example 7b-2 | Yellow | 92 g | 17 g | A2 | gly<br>2P<br>TeEG<br>DEG-mBE<br>HD | (27 g)<br>(4 g)<br>(5 g)<br>(6 g)<br>(4 g) |
| Example 8b-2 | Yellow | 92 g | 15 g | B2 | gly<br>2P<br>TeEG<br>DEG-mBE<br>HD | (28 g)<br>(3 g)<br>(5 g)<br>(6 g)<br>(6 g) |
| Example 9b-2 | Magenta | 92 g | 36 g | A2 | gly<br>2P<br>DEG<br>TEG-mBE<br>HD | (21 g)<br>(3 g)<br>(5 g)<br>(4 g)<br>(7 g) |
| Example 10b-2 | Magenta | 92 g | 34 g | B2 | gly<br>2P<br>DEG<br>TEG-mBE<br>HD | (22 g)<br>(3 g)<br>(5 g)<br>(4 g)<br>(7 g) |
| Example 11b-2 | Cyan | 48 g | 59 g | A2 | gly<br>2P<br>TEG<br>TEG-mBE<br>HD | (32 g)<br>(4 g)<br>(10 g)<br>(4 g)<br>(6 g) |
| Example 12b-2 | Cyan | 48 g | 58 g | B2 | gly<br>2P<br>TEG<br>TEG-mBE<br>HD | (32 g)<br>(4 g)<br>(10 g)<br>(4 g)<br>(6 g) |
| Comparative Example 1b-2 | Black A | 94 g | 56 g | — | gly<br>2P<br>TeEG<br>TEG-mBE<br>HD | (28 g)<br>(6 g)<br>(5 g)<br>(4 g)<br>(5 g) |
| Comparative Example 2b-2 | Black B | 94 g | 54 g | — | gly<br>2P<br>TeEG<br>DEG-mBE<br>HD | (30 g)<br>(5 g)<br>(5 g)<br>(5 g)<br>(5 g) |
| Comparative Example 3b-2 | Black C | 87 g | 61 g | — | gly<br>2P<br>DEG<br>TEG-mBE<br>HD | (29 g)<br>(4 g)<br>(7 g)<br>(6 g)<br>(4 g) |
| Comparative Example 4b-2 | Yellow | 92 g | 55 g | — | gly<br>2P<br>TeEG<br>DEG-mBE<br>HD | (30 g)<br>(5 g)<br>(5 g)<br>(6 g)<br>(6 g) |
| Comparative Example 5b-2 | Magenta | 92 g | 63 g | — | gly<br>2P<br>TeEG<br>TEG-mBE<br>HD | (24 g)<br>(4 g)<br>(5 g)<br>(4 g)<br>(7 g) |
| Comparative Example 6b-2 | Cyan | 48 g | 91 g | — | gly<br>2P<br>TEG<br>TEG-mBE<br>HD | (35 g)<br>(3 g)<br>(10 g)<br>(4 g)<br>(6 g) |

In addition to the above ink formulations, four inks based on conventional pigment dispersions were evaluated. As Comparative Example 7, the black ink of Epson Part #T034120 was used. As Comparative Example 8, the yellow ink of Epson Part #T034420 was used. As Comparative Example 9, the magenta ink of Epson Part #T034320 was used. As Comparative Example 10, the cyan ink of Epson Part #T034220 was used.

(3) Evaluation

The above inks were evaluated as described below.

(i) Continuous Printing Test

The reliability under continuous printing conditions of the above inks was evaluated as follows. First, the ink was degassed and sealed in a heat-sealable aluminum pack. Next, the ink was loaded into the black-ink print head of a PM-900C printer (Product Name, Seiko Epson Corporation). A line pattern which uses all of the nozzles was printed initially to establish that ink was being ejected from all nozzles with good directionality (angular deviation of an ejected ink droplet from a nozzle is within about ±0.50 from the normal to the plane of the nozzle). The printing pattern was changed to a 360 dots per inch solid block pattern that fills an A4 size sheet of paper. This printing speed was relatively fast such that about 4 pages were completed per minute. The block and line pattern was printed continuously with a printed sheet being evaluated every 100 sheets for evidence of loss of directionality, clogged nozzles, or decreases in optical density of the solid blocks (less than 5%). For all of the inks tested, no loss of directionality, no clogged nozzles, and no decreases in optical density were observed for 10,000 printed sheets, a level which indicates an acceptable level of reliability.

(ii) Long Term Storage Test

The reliability towards long-term storage in the print head of the above inks was evaluated as follows. First, the ink was degassed and sealed in a heat-sealable aluminum pack. Next, the ink was loaded into the black ink print head of an MJ-510C printer (Product Name, Seiko Epson Corporation). A line pattern, which uses all of the nozzles, was printed initially to establish that ink was being ejected from all nozzles with good directionality. Next, the ink supply was removed from the print head, and then the print head was removed from the printer. The uncapped print head was stored for 4 days at 40° C. in a constant temperature oven. The print head was reattached to the printer and the ink supply was reattached to the print head. The cleaning operation of the printer was executed followed by a line pattern that uses all of the nozzles. The cleaning operation followed by the line pattern was repeated until all of the nozzles printed with good directionality. For all of the inks tested, the number of cleaning operations necessary for full recovery was less than or equal to 4, a level which indicates an acceptable level of reliability.

(iii) Thermal Cycling Test

The reliability towards two temperature extremes (−30° C. and 60° C.) of the above inks was evaluated as follows. First, the ink was degassed and sealed in a 30 mL glass sample bottle. The sample bottle was loaded into a 60° C. constant temperature oven and stored at that temperature condition for 24 hours. The sample was removed from the oven and transferred to a −30° C. constant temperature refrigerator and stored at that temperature condition for 24 hours. This two-temperature cycle was repeated such that a total of ten cycles was completed. After the last cycle, the ink was thawed to room temperature, the glass sample bottle was inverted without shaking, and the bottom of the sample bottle was examined for precipitates. For all of the inks tested, no precipitates were observable, a level which indicates an acceptable level of reliability.

(iv) Print Quality: Plain Paper Text Sharpness

Print quality, in terms of plain paper optical density, was evaluated in the following way. For all ink samples, a fully saturated standard color patch was printed on Xerox 4024 paper at 720 dpi using a Stylus Color 980 printer (Product Name, Seiko Epson Corporation). After allowing the printed sample to dry at ambient temperature overnight, the optical density of the printed patch was evaluated using a Gretag-Macbeth Spectrolino instrument equipped with a Spectroscan table unit. For black inks, the following standards were used to evaluate the print quality in terms of plain paper optical density:

A: the optical density value was greater than 1.3,
B: the optical density value was greater than 1.2 but less than 1.3,
C: the optical density value was greater than 1.1 but less than 1.2,
D: the optical density value was greater than 1.0 but less than 1.1, and
F: the optical density value was less than 1.0.

For yellow, magenta, and cyan inks, the following standards were used to evaluate the print quality in terms of plain paper optical density:

A: the optical density value was greater than 1.2,
B: the optical density value was greater than 1.1 but less than 1.2,
C: the optical density value was greater than 1.0 but less than 1.1,
D: the optical density value was greater than 0.9 but less than 1.0, and
F: the optical density value was less than 0.9.

The results of this print quality test are shown below in Table 7 and 8.

(v) Print Quality: Plain Paper Text Sharpness

Print quality, in terms of text sharpness on plain paper, was evaluated in the following way. For all ink samples, a standard set of Japanese Kanji characters was printed using both Gothic and Minchou fonts at a 6-point character size. The samples were printed at 720 dpi using Xerox 4024 paper, as a representative plain paper, using a Stylus Color 980 printer (Product Name, Seiko Epson Corporation). The print samples were evaluated using an optical microscope. The following standards were used to evaluate the print quality:

A: the Kanji characters were sharp with no filling of interior voids within the characters,
B: the Kanji characters were sharp, but there was some filling of interior voids within characters with stroke counts greater than about 15, and
C: the Kanji characters were not sharp and there was significant filling of interior voids within characters with stroke counts greater than about 10.

The results of this print quality test are shown below in Table 7 and 8.

TABLE 7

| Sample | Plain Paper | | Specialty Media | | |
|---|---|---|---|---|---|
| | OD Value | Text Sharpness | OD Value | Lustrousness | Adhesion |
| Example 1a-2 | A | A | A | A | A |
| Example 2a-2 | A | A | A | A | A |
| Example 3a-2 | A | A | A | A | A |
| Example 4a-2 | A | A | A | A | A |
| Example 5a-2 | A | A | A | A | A |
| Example 6a-2 | A | A | A | A | A |
| Example 7a-2 | A | A | A | A | A |
| Example 8a-2 | A | A | A | A | A |
| Example 9a-2 | A | A | A | A | A |
| Example 10a-2 | A | A | A | A | A |
| Example 11a-2 | A | A | A | A | A |
| Example 12a-2 | A | A | A | A | A |
| Comparative Example 1a-2 | A | B | B | C | C |
| Comparative Example 2a-2 | A | B | B | C | C |
| Comparative Example 3a-2 | A | B | B | C | C |
| Comparative Example 4a-2 | A | B | B | C | C |
| Comparative | A | B | B | C | C |

TABLE 7-continued

| Sample | Plain Paper | | Specialty Media | | |
|---|---|---|---|---|---|
| | OD Value | Text Sharpness | OD Value | Lustrousness | Adhesion |
| Example 5a-2 | | | | | |
| Comparative Example 6a-2 | A | B | B | C | C |
| Comparative Example 7a-2 | F | C | A | A | A |
| Comparative Example 8a-2 | D | C | A | A | A |
| Comparative Example 9a-2 | F | C | A | A | A |
| Comparative Example 10a-2 | D | C | A | A | A |

TABLE 8

| Sample | Plain Paper | | Specialty Media | | |
|---|---|---|---|---|---|
| | OD Value | Text Sharpness | OD Value | Lustrousness | Adhesion |
| Example 1b-2 | A | A | A | A | A |
| Example 2b-2 | A | A | A | A | A |
| Example 3b-2 | A | A | A | A | A |
| Example 4b-2 | A | A | A | A | A |
| Example 5b-2 | A | A | A | A | A |
| Example 6b-2 | A | A | A | A | A |
| Example 7b-2 | A | A | A | A | A |
| Example 8b-2 | A | A | A | A | A |
| Example 9b-2 | A | A | A | A | A |
| Example 10b-2 | A | A | A | A | A |
| Example 11b-2 | A | A | A | A | A |
| Example 12b-2 | A | A | A | A | A |
| Comparative Example 1b-2 | A | B | B | C | C |
| Comparative Example 2b-2 | A | B | B | C | C |
| Comparative Example 3b-2 | A | B | B | C | C |
| Comparative Example 4b-2 | A | B | B | C | C |
| Comparative Example 5b-2 | A | B | B | C | C |
| Comparative Example 6b-2 | A | B | B | C | C |

(vi) Print Quality: Specialty Media Optical Density Test

Print quality, in terms of specialty media optical density, was evaluated in the following way. For all ink samples, a fully saturated standard color patch was printed on Epson Premium Glossy Photo Paper at the default setting for that medium using a Stylus Color 980 printer (Product Name, Seiko Epson Corporation). After allowing the printed sample to dry at ambient temperature overnight, the optical density of the printed patch was evaluated using a Gretag-Macbeth Spectrolino instrument equipped with a Spectroscan table unit. The following standards were used to evaluate the print quality in terms of specialty media optical density:

A: the optical density value was greater than 2.0,

B: the optical density value was greater than 1.9 but less than 2.0,

C: the optical density value was greater than 1.8 but less than 1.9,

D: the optical density value was greater than 1.7 but less than 1.8, and

F: the optical density value was less than 1.7.

The results of this print quality test are shown below in Table 7 and 8.

(vii) Print Quality: Specialty Media Lustrousness Test

Print quality, in terms of specialty media that exhibit lustrousness, was evaluated in the following way. For all ink samples, a single individual sample was evaluated as one component of a four-color (Yellow-Magenta-Cyan-Black) ink set. For the three remaining complementary reference colors of the four-color evaluation set, the appropriate three inks were selected from the set of inks in Comparative Examples 7 through 10. As the reference sample for this print quality test, all four of the inks in Comparative Examples 7 through 10 were used. A standard photographic portrait of a brunette model was printed on Epson Premium Glossy Photo Paper at the default setting for that medium using a Stylus Color 980 (Product Name, Seiko Epson Corporation). All printed samples were set aside to dry at ambient temperature overnight. The following standards were used to evaluate the print quality in terms of specialty media lustrousness:

A: in comparison to the reference sample, there were no distinguishable differences in lustrousness across the whole photographic image, B: in comparison to the reference sample, there were slight differences in lustrousness across the whole photographic image. For evaluated black and cyan inks, these differences were most noticeable within regions of the model's hair. For evaluated magenta and yellow inks, these differences were most noticeable within regions of the model's face.

C: in comparison to the reference sample, there were large differences in lustrousness across the whole photographic image. For evaluated black and cyan inks, these differences were most noticeable within regions of the model's hair. For evaluated magenta and yellow inks, these differences were most noticeable within regions of the model's face.

The results of this print quality test are shown below in Table 7 and 8.

(viii) Print Quality: Specialty Media Adhesion Test

Print quality, in terms of adhesion on specialty media, was evaluated in the following way. For all ink samples, multiple lines of a standard text sample at a 14-point character size was printed on Epson Photo Paper at the default setting for that medium using a Stylus Color 980 printer (Product Name, Seiko Epson Corporation). After allowing the printed sample to dry at ambient temperature overnight, a fluorescent highlighting pen (Zebra Zazzle Fluorescent Highlighter, Zebra Pen Company) was marked over a 3 centimeter strip of text at a pressure of 300 grams. A yellow highlighting pen was used for black, cyan, and magenta text samples. A pink highlighting pen was used for yellow text samples. The following standards were used to evaluate the print quality in terms of adhesion on specialty media:

A: there was no streaking of the printed text images into the highlighted ink;

B: there was slight streaking of the printed text images into the highlighted ink;

C: there was considerable streaking of the printed text images into the highlighted ink.

The results of this print quality test are shown below in Table 7 and 8.

As can be seen from the above results in Table 7 and 8, all of the inks of the present invention showed excellent results for the all of the print quality tests.

The invention claimed is:

1. A polyuronic acid derivative comprising glyceryl poly(oxypropylene) triamine and polyuronic acids which are attached by reductively amination, through reducing termini of the polyuronic acids, to the glyceryl poly(oxypropylene) triamine.

2. The polyuronic acid derivative according to claim 1, wherein one polyuronic acid is attached by reductively amination, through a reducing terminus of the polyuronic acid, to the glyceryl poly(oxypropylene) triamine which is represented by the general formula:

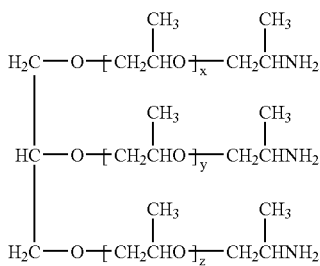

wherein the average value of the sum, x+y+z, is greater than or equal to 10 and less than or equal to 150.

3. The polyuronic acid derivative according to claim 2, wherein the average value of the sum, x+y+z, in the glyceryl poly(oxypropylene) triamine represented by the general formula is greater than or equal to 10 and less than or equal to 100.

4. The polyuronic acid derivative according to claim 1, wherein two to six polyuronic acids are attached by reductively amination, through reducing termini of the polyuronic acid, to the glyceryl poly(oxypropylene) triamine which is represented by the general formula:

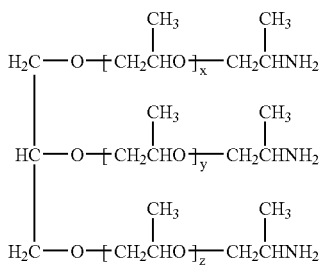

wherein the average value of the sum, x+y+z, is greater than or equal to 30 and less than or equal to 250.

5. The polyuronic acid derivative according to claim 4, wherein the average value of the sum, x+y+z, in the glyceryl poly(oxypropylene) triamine represented by the general formula is greater than or equal to 30 and less than or equal to 120.

6. The polyuronic acid derivative according to claim 1, wherein the polyuronic acid is composed primarily of 1,4-linked poly-(a-D-galacturonic acid) or 1,4-linked poly-(a-L-guluronic acid).

7. The polyuronic acid derivative according to claim 1, wherein the number average molecular weight of the polyuronic acid segment is greater than or equal to 700.

8. A pigment dispersant comprising the polyuronic acid derivative according to claim 1.

9. A pigment dispersed aqueous ink composition comprising water as the principal solvent, a pigment, and the pigment dispersant according to claim 8.

10. The pigment dispersed aqueous ink composition according to claim 9, wherein said ink composition contains 0.1 to 20% pigment, 0.1 to 10% pigment dispersant, and 70 to 99.8% aqueous carrier medium.

11. An aqueous ink composition comprising water as the principal solvent, a self-dispersed pigment, and the polyuronic acid derivative according to claim 1.

12. The aqueous ink composition according to claim 11, wherein the ink composition contains 0.1 to 20% self-dispersed pigment, 0.1 to 10% polyuronic acid derivetive, and 70 to 99.8% aqueous carrier medium.

13. The aqueous ink composition according to claim 10, wherein the polyuronic acid segment in the polyuronic acid derivative is neutralized with a neutralizing agent selected from the group consisting of organic bases, alkanolamines, alkali metal hydroxides, and mixtures thereof.

14. A printing method comprising the step of depositing the ink composition according to claim 9 onto a recording medium.

15. An ink jet recording method comprising the steps of ejecting and depositing droplets of the ink composition according to claim 9 onto a recording medium.

16. A record produced by the method according to claim 14.

* * * * *